Jan. 9, 1962  F. G. ZAGAR  3,015,832
MULTIPLE SPINDLE NUT TAPPING MACHINE
Filed March 2, 1960  11 Sheets-Sheet 1

INVENTOR
Frank G. Zagar
BY Evans & Pearne
ATTORNEYS

INVENTOR
*Frank G. Zagar*
BY Evans & Pearne
ATTORNEYS

INVENTOR
Frank G. Zagar
BY
ATTORNEYS

Jan. 9, 1962 F. G. ZAGAR 3,015,832
MULTIPLE SPINDLE NUT TAPPING MACHINE
Filed March 2, 1960 11 Sheets-Sheet 5

INVENTOR
Frank G. Zagar
BY Evans & Leane
ATTORNEYS

Jan. 9, 1962 F. G. ZAGAR 3,015,832
MULTIPLE SPINDLE NUT TAPPING MACHINE
Filed March 2, 1960 11 Sheets-Sheet 6

INVENTOR
Frank G. Zagar
BY Evans & Pearne
ATTORNEYS

Jan. 9, 1962  F. G. ZAGAR  3,015,832
MULTIPLE SPINDLE NUT TAPPING MACHINE
Filed March 2, 1960  11 Sheets-Sheet 8

INVENTOR
Frank G. Zagar
BY Evans & Pearne
ATTORNEYS

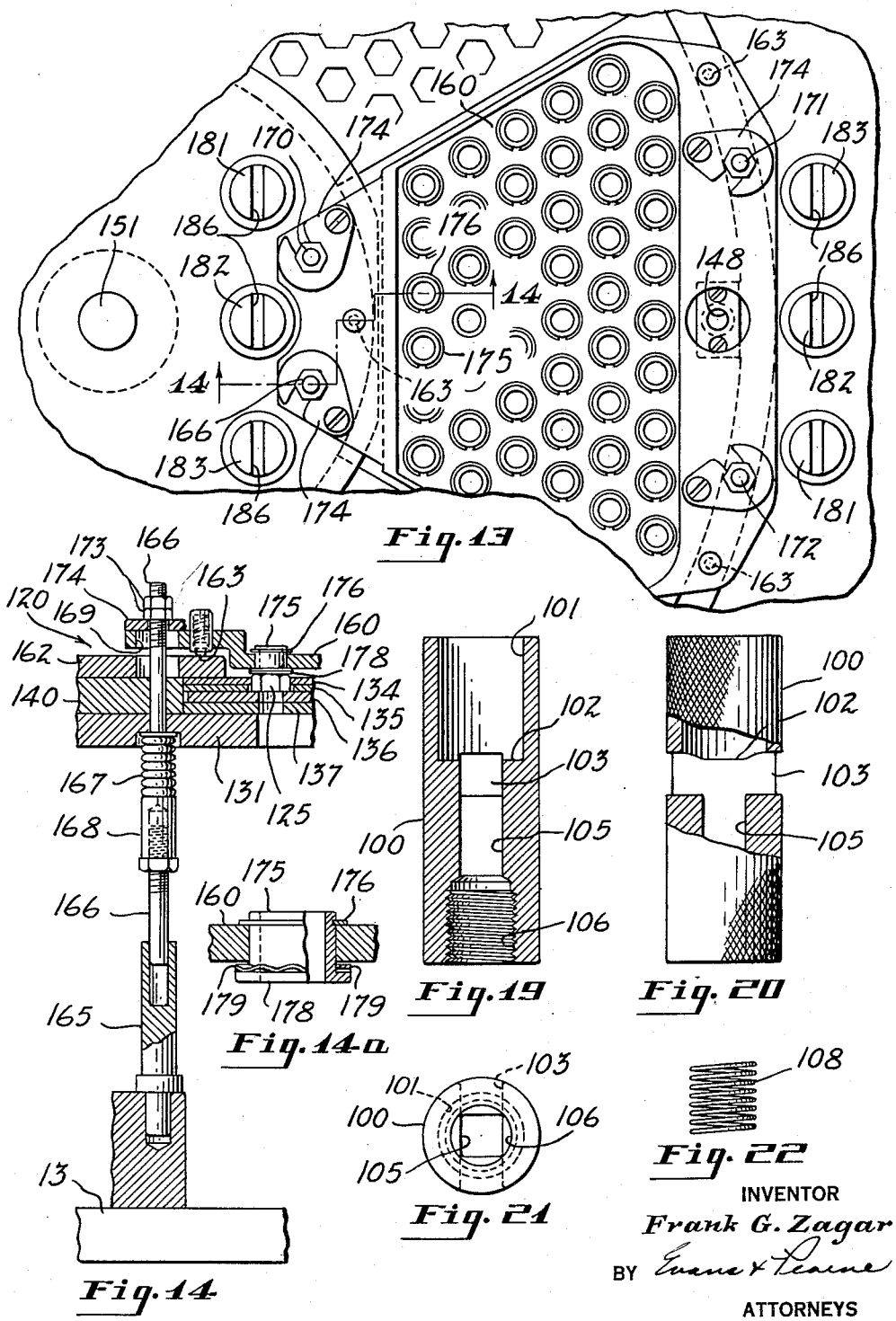

Jan. 9, 1962  F. G. ZAGAR  3,015,832
MULTIPLE SPINDLE NUT TAPPING MACHINE
Filed March 2, 1960  11 Sheets-Sheet 10

INVENTOR
*Frank G. Zagar*
BY *Evans & Pearne*
ATTORNEYS

Jan. 9, 1962  F. G. ZAGAR  3,015,832
MULTIPLE SPINDLE NUT TAPPING MACHINE
Filed March 2, 1960  11 Sheets-Sheet 11

INVENTOR
Frank G. Zagar
BY Evans & Pearne
ATTORNEYS 3,015,832
MULTIPLE SPINDLE NUT TAPPING MACHINE
Frank G. Zagar, Cleveland, Ohio, assignor to Zagar, Inc., Cleveland, Ohio, a corporation of Ohio
Filed Mar. 2, 1960, Ser. No. 12,324
20 Claims. (Cl. 10—130)

This invention relates to a machine for tapping internally threaded fasteners. Such fasteners are hereafter referred to as "tapped nuts" or "nuts."

More particularly, the invention relates to a machine for the quantity manufacture of tapped nuts from nut blanks which have been formed to the desired outside shape and provided with a central hole.

The quantity manufacture of tapped nuts has generally utilized single spindle, high speed tapping machines, with banks of such machines being employed in order to achieve production of from 50,000 to 100,000 nuts per hour. In general, single spindle machines have been limited individually to a production of approximately 10,000 nuts per hour.

The potential high capacity of a multiple spindle machine offers many advantages. One of the most important of these is the possibility of greatly reducing tapping speed and therefore greatly lengthening tap life and eliminating other problems occasioned by the heating effects of high speed drilling. In this connection the present invention has been embodied in a machine which achieves an output of from 50,000 to 100,000 nuts per hour at tap speeds of 600 r.p.m. as compared to single spindle machines now generally in use which have an individual output of about 10,000 nuts per hour at tap speeds of approximately 2,000 r.p.m.

Another advantage of multiple spindle tapping is that relatively low tap speeds may be employed to economically achieve production of as high as 50,000 to 100,000 nuts per hour or more. Such low tap speeds allow very high thread accuracy to be achieved through employment of positive feed means such as lead screws.

Exploitation of the above potential advantages of multiple spindle nut tapping machines requires a relatively high number of spindles, say in the order of 50 to 100 spindles. The problems attendant on the simultaneous tapping of 50 to 100 nuts or stacks of nuts in a single machine have not previously been overcome. Among these problems is the difficulty of producing nuts of uniformly good quality without at least a small percentage of the taps intermittently or constantly producing damaged nuts due to the inevitable deflections and deformations incident to the high additive thrust load which must be imposed through the numerous spindles in order to cause the taps to cut. The presence of even a small percentage of spoiled nuts in the finished work is highly objectionable and renders a machine producing such spoilage unacceptable to the nut manufacturing industry.

Another problem is the practical requirement that down time of all 100 spindles be minimized when tap breakage does sporadically occur and occasions replacement of the taps. In this connection it is important that any one of the great number of taps may be replaced as desired within the matter of seconds without otherwise interfering with the operation of the machine.

Another problem has been the high torque requirements of 50 or 100 simultaneously operating taps and the high power requirements for production operation of apparatus which includes such simultaneously operating taps.

The present invention has for its broad purpose the solution of the above problems.

In important aspects, the invention relates to the concept of bringing together an array of nut blanks and a corresponding array of taps in a feed phase by employing positive feed means such as lead screw means and axially restraining the taps during such feed phase for imposition of tapping thrust against the nut blanks throughout the work-engaging portion of the feed phase and for then removing such axial restraint not later than the terminal part of the work-engaging portion of the withdrawal phase.

In one more particular aspect, the invention embodies the provision of a plurality of taps linked to the tap head for rotational driving thereby with the taps also being associated with the tap head for limited sliding motion relative thereto between an inward thrust-transmitting position and an outward no-thrust position, with thrust means being associated with the tap head for receiving the taps in abutting relationship only in such inward thrust-transmitting position of the taps. Also involved in this particular aspect of the invention is the provision for a moving-apart motion as between workpieces and the tap head which is independent of the positive feed motion and which occurs at an intermediate portion in the cycle of operation of the machine, all as set forth in particular below in connection with the following description of one particular embodiment of the invention. This particular embodiment is illustrated in the accompanying drawings, in which:

FIGURE 13 is a view on a somewhat enlarged scale of the portion of the apparatus seen in the upper central portion of FIGURE 10.

FIGURE 14 is a fragmentary section taken on the plane of line 14—14 in FIGURE 13.

FIGURE 14a is a view on an enlarged scale of a small portion of the apparatus seen in FIGURE 14.

FIGURE 19 is a cross-sectional detail showing a tap holder employed in the illustrated apparatus.

FIGURE 20 is another sectional view showing the same tap holder.

FIGURE 21 is an end view of the same tap holder.

FIGURE 22 is a detail of a spring insert employed in the tap holder shown in FIGURES 19–21.

Figure 4:
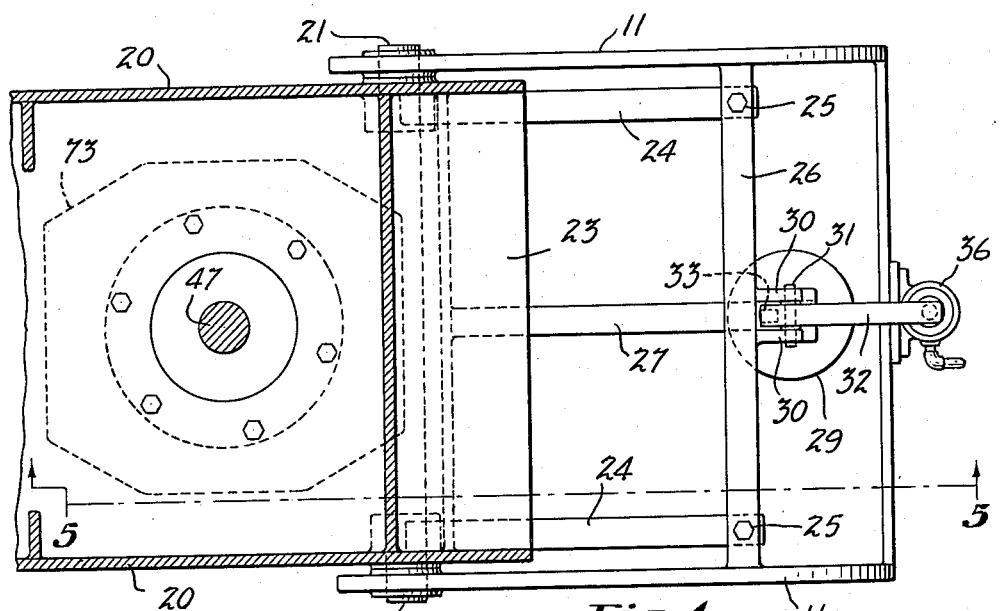
FIGURE 4 is a view taken from the plane of line 4—4 in FIGURE 1.
Figure 5:
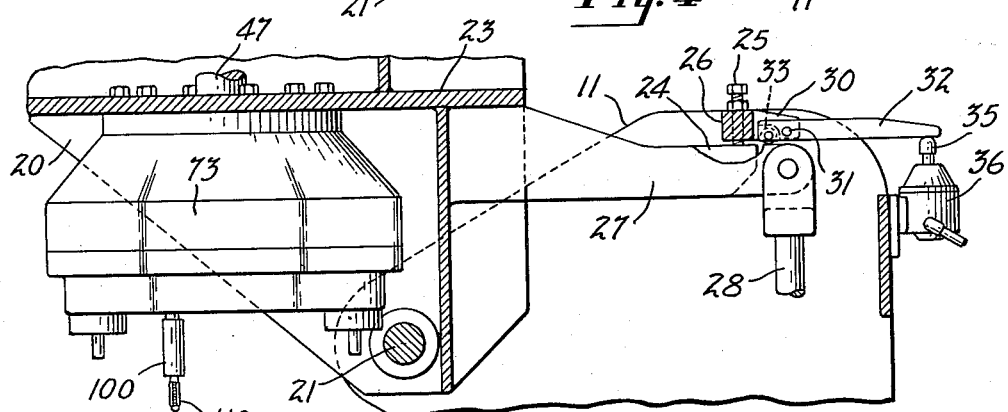
FIGURE 5 is a view taken from the plane of line 5—5 in FIGURE 4.
Figure 5A:
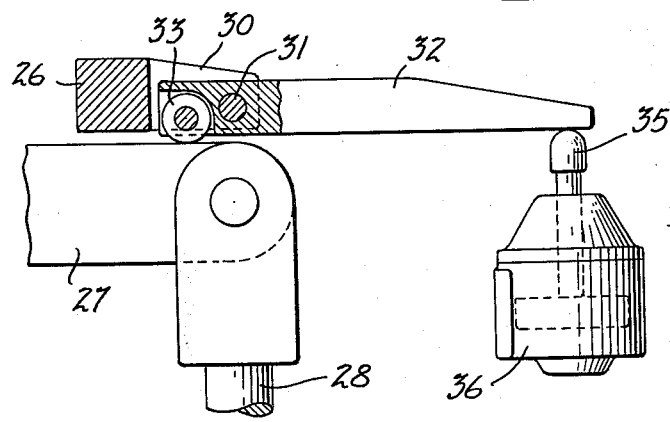
FIGURE 5a is an enlarged view of elements seen in the upper right portion of FIGURE 5.
Figure 6:
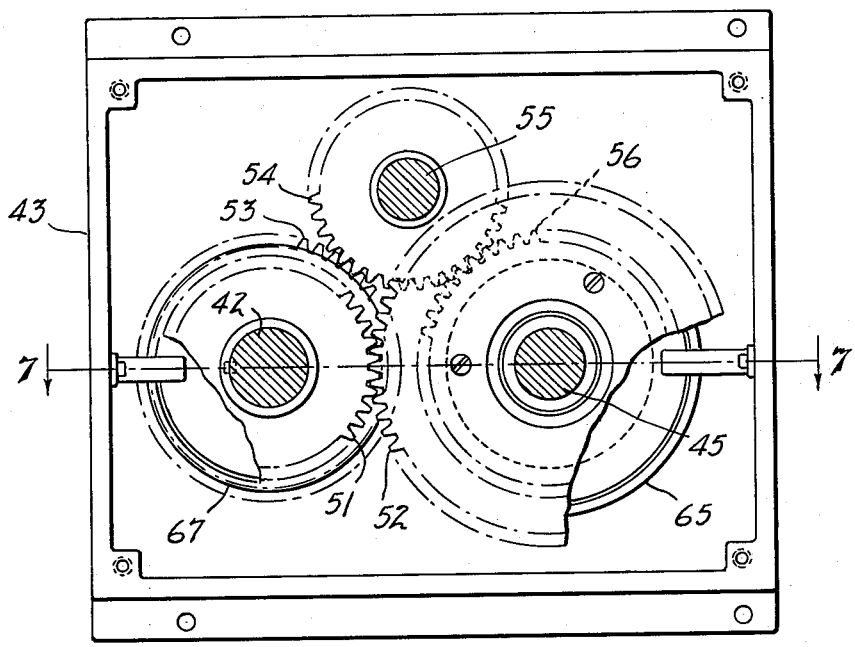
FIGURE 6 is a view taken from the plane of lines 6—6 in FIGURES 1 and 7.
Figure 7:
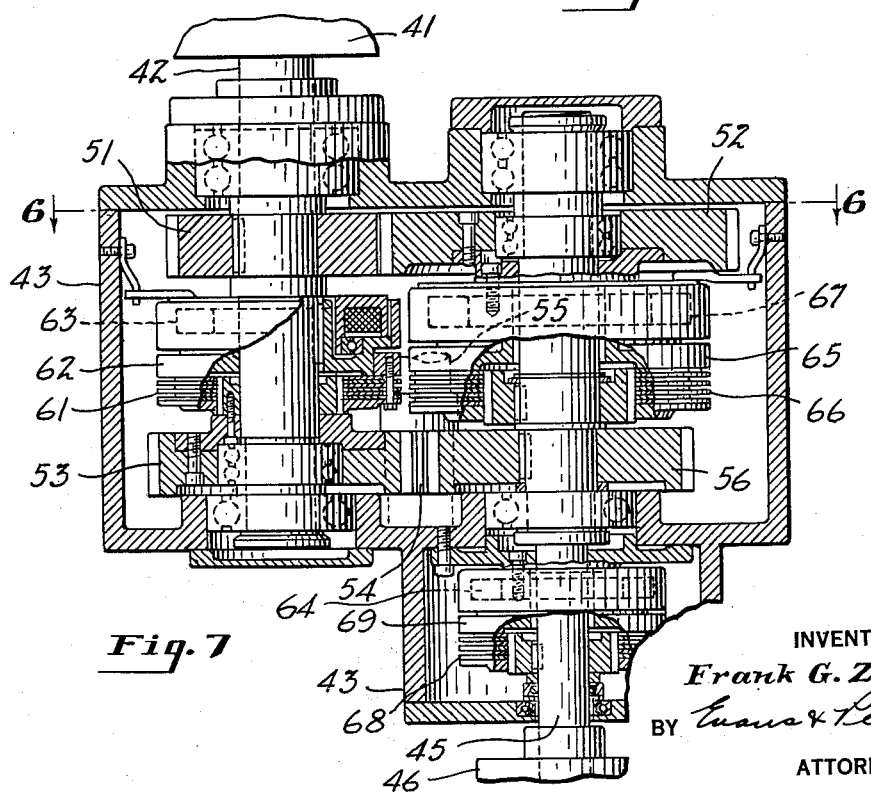
FIGURE 7 is a view taken from the plane of line 7—7 in FIGURE 6.
Figure 8:
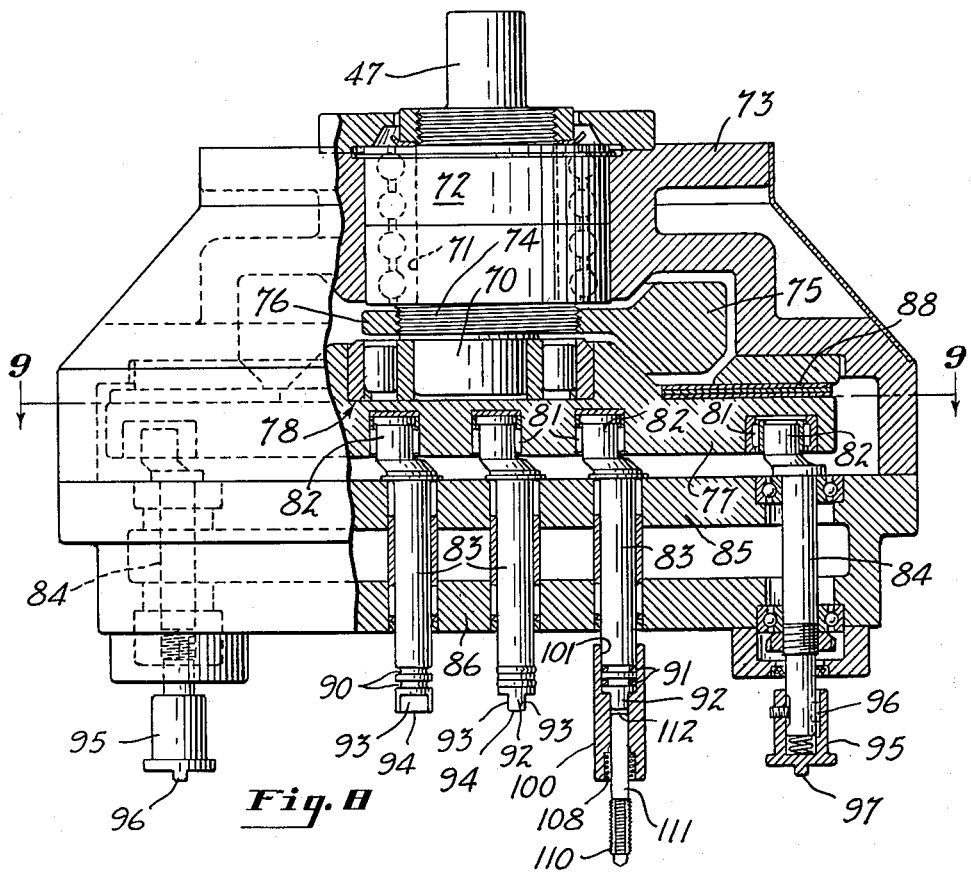
FIGURE 8 is a partly broken away elevational view of the multiple spindle drive head of the illustrated embodiment of the invention.
Figure 9:
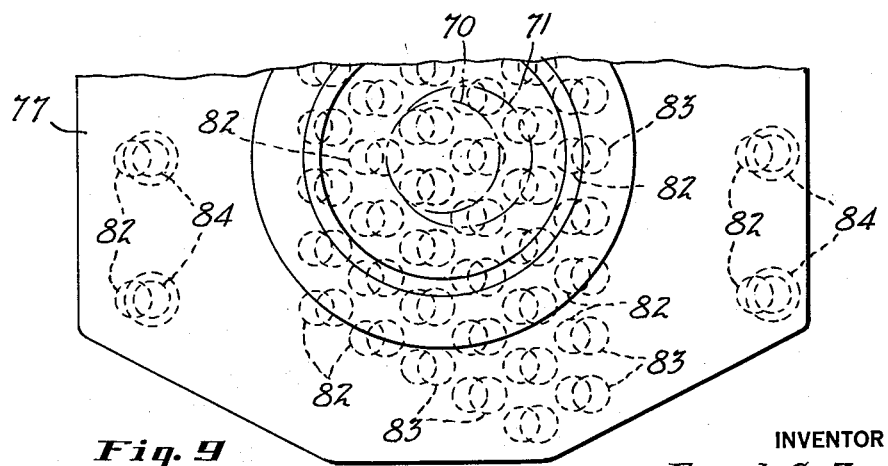
FIGURE 9 is a view taken from the plane of line 9—9 in FIGURE 8.

In order to facilitate and condense description of the invention, the following discussion of the drawings will specify reference numerals for the various parts and in parentheses will specify by number the figure or figures of the drawings in which such reference numerals may be found. For example, "lever 32 (4, 5)" signifies that the particular part referred to is given the reference numeral 32 and is to be conveniently found in FIGURES 4 and 5.

Stationary support frame structure

The mechanism as a whole is supported in stationary support means comprising a frame and table structure 10 (1, 2) having fixed upstanding sidewalls 11 (1–5) and also having a stationary surface 12 (1, 2, 14) on which is positioned a stationary pad member 13 (1, 2, 10, 11, 14, 17, 18).

Pivoted between the sidewalls 11 are a pair of frame walls 20 (1–5). The members 20 are mounted on pivot bushings which turn on a pivot shaft 21 (1–5). One of the tie members extending between the side plates 20 comprises a frame plate 23 (1–5). Fixed to the plate 23 and extending rearwardly thereof are a pair of levers 24 (1, 4, 5). When the pivoting structure is positioned at its lower position, the levers 24 engage adjustable stop bolts 25 (4, 5) which are threadedly engaged in a cross-bar 26 extending between the side plates 11. An additional lever 27 (1, 4, 5) is affixed to the plate 23 intermediate the levers 24. The lever 27 is pivotally fixed to the actuating arm 28 (1, 5) of a hydraulic actuating cylinder 29 (1, 4).

A pair of ears 30 (4, 5) extend rearwardly from the fixed cross-bar 26 to receive a pivot pin 31 on which is mounted a lever 32 (4, 5) having a camming roller 33 at the inboard end thereof.

Engageable with the outboard end of the lever 32 is an actuating plunger 35 (5) which is powered by the hydraulic cylinder 36 (4, 5). It will be understood that the roller 33 cams against the upper surface of the lever 27 to force the entire pivoting head carried between the plates 20 slightly upwardly to move the levers 24 a short distance away from contact with the stop bolts 25 against the pressure of the hydraulic cylinder 29 to therefore slightly raise the entire structure supported between the plates 20. It will be further understood that retraction of the actuating cylinder 29 bodily raises the entire structure carried between the plates 20 to the dotted line shown in FIGURE 1. This structure may be referred to as the tap head and is generally indicated by the reference numeral 38 (1, 2).

Power drive

Carried between the upper portions of the side plates 20 is a motor 40 (1) which, through a belt and pulley linkage, drives a flywheel 41 (1, 2). The output shaft 42 (1, 2) is received in a housing 43 (1, 2, 6, 7) and is adapted by mechanism within said housing to be alternatively connected to a shaft 45 to drive the latter shaft in opposite directions of rotation. Through a suitable flexible connection 46 (1, 2, 7) the shaft 45 drives a shaft 47 (1, 2, 8) which constitutes a main drive shaft for the plurality of taps to be employed in the apparatus.

The mechanism within the housing 43 comprises torque-reversing linkage means of a well-known reversing clutch-and-brake type and in the particular apparatus illustrated comprises a spur gear 51 keyed to the shaft 42 and drivingly engaging a spur gear 52 which is rotatably mounted on the shaft 45 and also comprising a spur gear 53 which is rotatably mounted on the shaft 42 and which drivingly engages an idler gear 54 mounted on a lead shaft 55 (6), the idler gear 54 in turn driving a spur gear 56 which is keyed to the shaft 45.

Fixed through suitable sleeve means for rotation with the spur gear 53 is a clutch element 61. Keyed to the shaft 42 is a cooperating clutch element 62. The clutch elements 61 and 62 are adapted to be engaged and disengaged in a well-known manner by energizing the floating winding 63 which surrounds the shaft 42. Fixed through suitable sleeve means for rotation with the spur gear 52 is a clutch element 65. An associated clutch element 66 is keyed for rotation with the shaft 45. The clutch elements 65 and 66 are adapted to be engaged and disengaged by a floating winding 67 which surrounds the shaft 45.

From the above, it will be understood that the clutch elements 62 and 65 constantly rotate while the machine is in operation and that the shaft 45 is alternately driven through either the clutch element 61 or the clutch element 66 depending on the activation and de-activation of the floating windings 63 and 67. Driving through the clutch element 61 results in a first direction of rotation of the shaft 45 and driving through the clutch element 66 results in the opposite direction of rotation of the shaft 45. One of these directions of rotation applies to the feed phase of the apparatus, and the opposite direction of rotation applies to the withdrawal phase of the apparatus. To enable a quick stopping action to be accomplished, a brake may be provided wherein a brake element 68 which is keyed to the shaft 45 is urged by energization of a winding 64 into engagement with a fixed brake element 69. By appropriate relay means, the winding 64 is energized only when both the windings 63 and 67 are de-energized. The result is that the shaft 45 and the parts driven thereby are braked unless one or the other of the clutches 61, 62 or 65, 66 are engaged.

All the above will be well-known to those familiar with the reversing drives for machine tools and the like.

The main drive shaft 47 on the output side of the flexible coupling 46 carries a crank pin 70 that is offset radially with respect to the axis of the shaft 47.

An enlarged portion 71 (8) of the shaft 47 is engaged in a bearing 72 which is received with a housing 73 forming one of the major structural elements of the multiple spindle head. On a threaded flange 74 which is associated with the shaft 47 is received a counterweight 75 having a threaded central collar portion 76 which is threadedly engaged on the flange 74. The counterweight 75 may be fixed against rotation with respect to the shaft 47 by a suitable set screw means or keying means or the like (not shown).

The crank pin 70 is received in a driving plate 77 (9) with suitable roller bearings and races generally indicated by the reference numeral 78 being located therebetween. The driving plate 77 has formed in its bottom side a plurality of downwardly opening sockets in which metal bearings 81 are positioned, and the downwardly opening sockets receive crank pins 82 each of which is associated with one or a plurality of spindles 83 and 84. The spindles 83 and 84 are preferably mounted in spaced plates 85 and 86 to firmly support the spindles in aligned relationship.

Upward thrust loads transmitted through the spindles 83 and the plates 77 are carried by a bearing plate 88 which is provided between the housing 73 and the upper side of the driving plate 77.

The structure as described immediately above may be varied in some details according to the disclosures, for example, of U.S. Patent 2,522,736, wherein particularly it is noted that roller bearings 58 are provided in the driving-plate multiple-spindle apparatus there shown.

The free ends of the spindles 83 are adapted to receive tap holders to be more particularly described below and are provided with grooves 90 in which rubber rings 91 are received. The lower ends of the spindles 83 also have a reduced portion 92 formed by the opposed flats 93 which are adapted to provide keying relationship with the tap holders and taps associated therewith as to be more particularly described below.

In the particular apparatus illustrated, the spindles 84 receive at their lower ends clutch elements 95 which are keyed thereto by keying means 96 for sliding relationship with respect thereto. The lower end of each of the clutch elements 95 has a driving rib 97 formed thereon.

*Tap holders and taps*

The tap holders 100, shown in the drawings most clearly in FIGURES 8 and 19–21, comprise sleeves having upper bores 101 adapted to receive the lower portions of the spindles 83 together with the rings 91, the rings 91 serving to frictionally engage the bore 101 to releasably maintain the tap holders 100 and the spindles 83 in interengaged relationship.

The bore 101 bottoms against a shoulder 102. Extending both above and below the shoulder 102 is a transversely extending square opening or slot 103 which is formed in the sleeve 100 by transversely drilling and broaching therethrough. The portion of the slots 103 which are in register with the bore 101 receive the reduced portion 92, and the flat sides of the slot 103 are engaged in keying relationship between flat faces 93 of the reduced portion 92.

The tap holder 100 is further provided with a central bore 105 and with a threaded bore 106 of somewhat greater diameter than the central bore 105. Interenengaged with the threads of the threaded bore 106 is a helical spring 108 (22).

The taps employed in the apparatus are indicated by the reference numeral 110 and are provided with the usual upper shank portion 111 (8) adapted to be received in surrounding and gripped relationship by the spring 108 of the associated tap holder 100. The upper portion of each tap shank 111 is received in mating relationship in the central bore 105 and the uppermost inner end 112 (8) is engageable against the lowermost outer end 94 of each of the spindles 83. When the inner ends 112 of the taps are engaged against the outer ends 94 of the spindles 83, the taps are located in an inward thrust-transmitting position whereby thrust is transmitted through the abutting ends 94 and 112. However, at certain times in the operation of the apparatus and in a manner to be more fully described below, the taps 110 are slidable within the tap holders from inward thrust-transmitting position to outward no-thrust position wherein there is a slight spacing of perhaps $\frac{1}{16}''$ or thereabouts between the ends 94 and 112.

*Platform means for supporting workpieces*

Platform means generally indicated by the reference numeral 120 (1, 2, 10, 11) is provided for supporting a plurality of workpieces 125 (10, 11, 14) which enter the machine as nut blanks and leave the machine as tapped nuts. The nut blanks are supported at the tapping station in spread array and the taps 110 supported by the multiple spindle head are supported in corresponding array in apposition to the nut blanks 125.

Figures 11, 12:
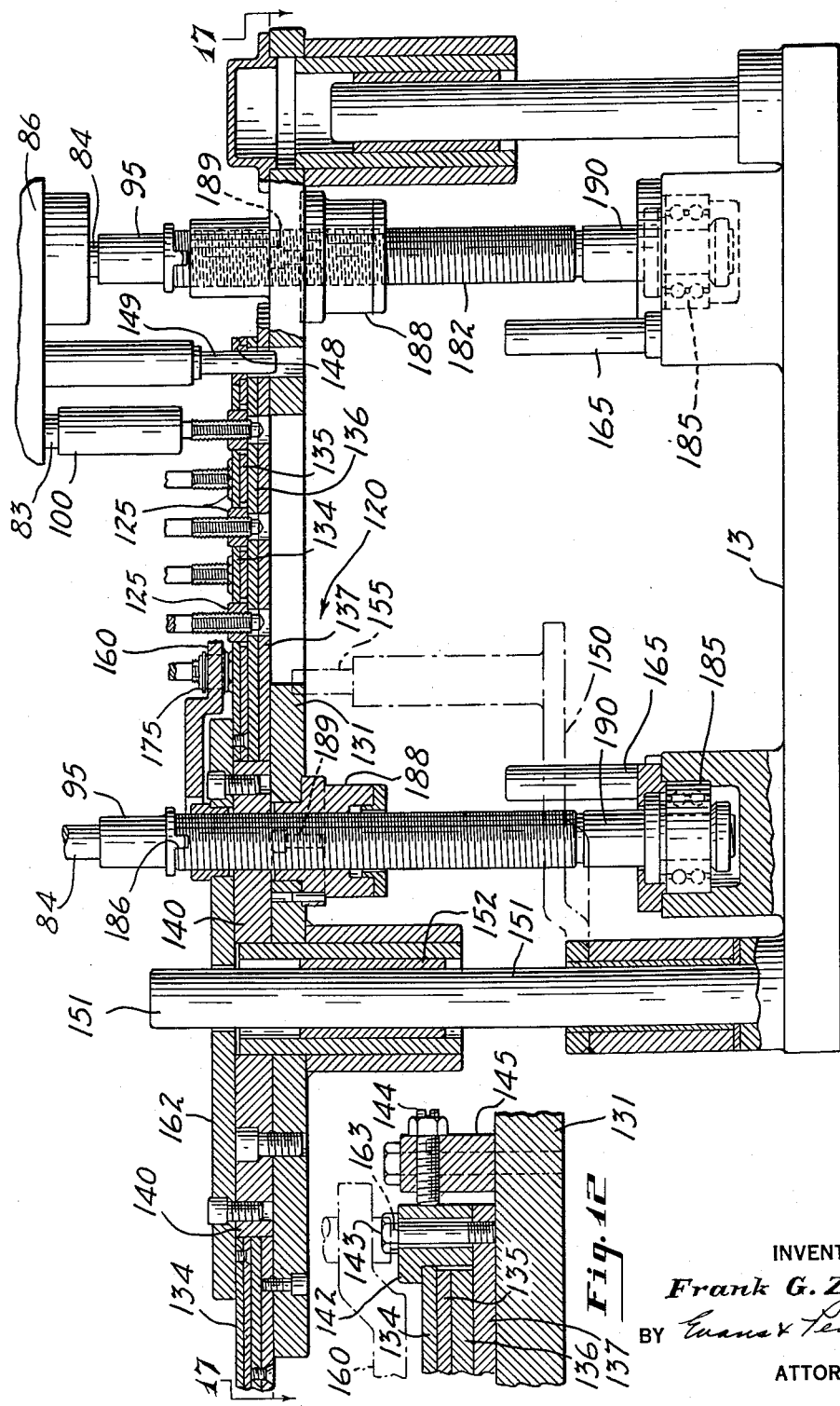
FIGURE 11 is a view taken from the plane of line 11—11 in FIGURE 10.
FIGURE 12 is a fragmentary view taken from the plane of line 12—12 in FIGURE 10.

The platform means 120 includes a base plate 131 (1, 10–12, 14, 17, 18). Socket-defining means are provided on the base plate 131 for holding the nut blanks in the above-mentioned spread array at the tapping station which is the station immediately under the multiple spindle head. In the apparatus illustrated, the socket-defining means comprises a plurality of plates including the plates 134, 135, 136 and 137 (10–12). The plates 136 and 137 are affixed to the base plate 131 and move therewith. Located centrally on the base plate 131 is a center plate 140 (11) against which the arcuate inner surface of the plate 134 is received, as seen most clearly at the left end of FIGURE 11. In the apparatus illustrated, the plate 134 and its associated plate 135 constitute one of a series of perforate slideplates or slide-plate assemblies. These slideplates function as socket-defining means for the nut blanks and are translated transversely with respect to the direction of tapping feed and withdrawal motions of the apparatus, such translation occurring between tapping operations. More particularly in the apparatus specifically described, the perforate slideplates comprise a circular train of slideplate segments made up of an endless succession of the plates 134 and 135 which are translatable successively past the tapping station and along the slideplate guide means constituted by the periphery of the central plate 140 and by additional guide means such as the adjustable guide lugs 142 (10, 12) adapted to engage the outer periphery of the plates 134. The guide lugs 142 are provided with adjustable tightening nuts 143 and are associated with bolts 144 threadedly engaged with mounting blocks 145 as seen in FIGURE 12. Accordingly, the bolts 143 may be loosened and the bolts 144 tightened to snugly engage the member 142 against the outer arcuate periphery of the train of passing plates 134 whereupon the bolts 143 are tightened to hold the lug 142 firmly in position. The guide lugs 142 function as wear plates and wear is compensated for by tightening of the bolts 144 to readily inwardly adjust the members 142 as above described.

Figure 10:
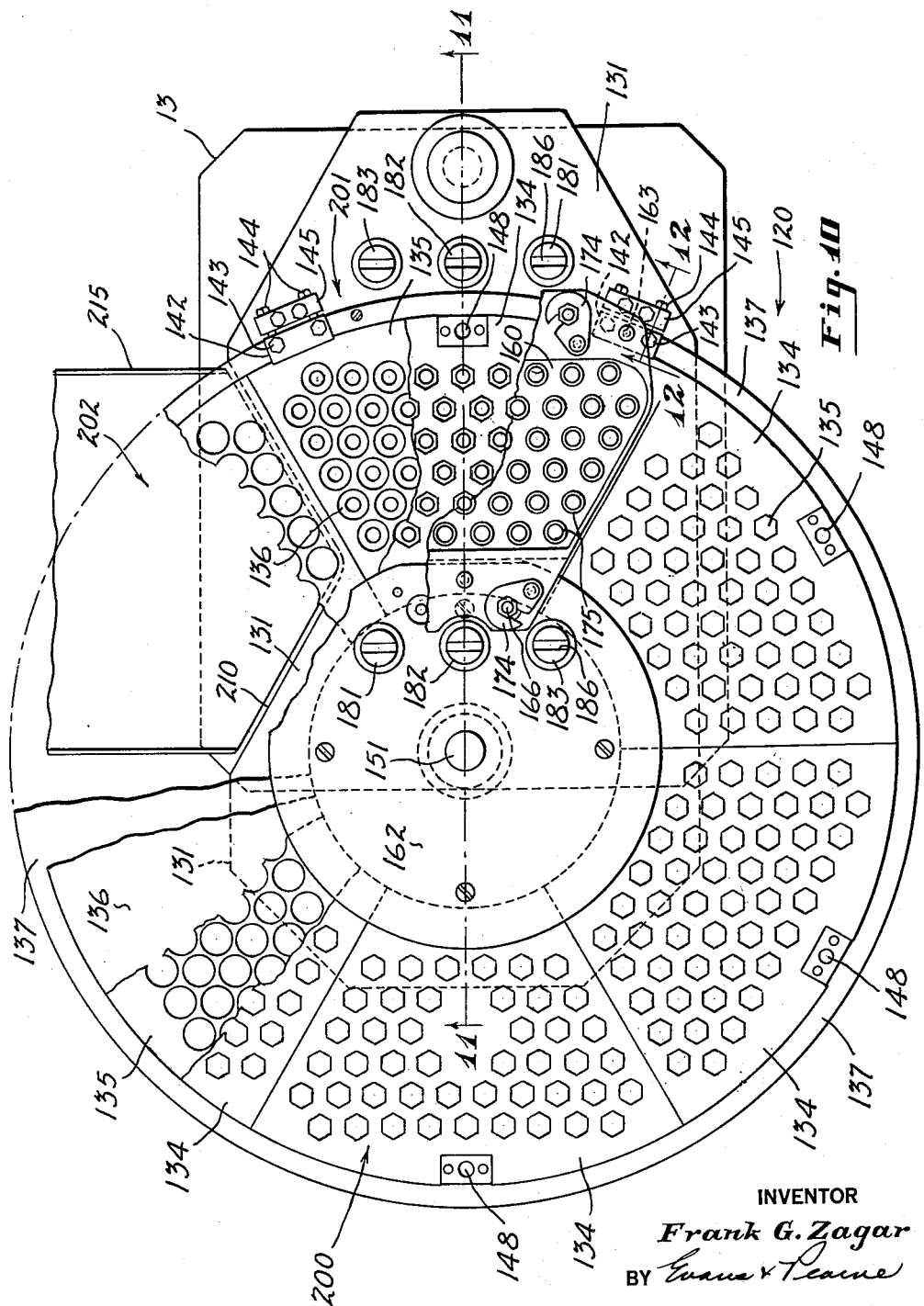
FIGURE 10 is a partly broken away view taken from the plane of line 10—10 in FIGURE 1.

Only two wear plates 142 are illustrated in FIGURE 10 but it will be understood that additional plates are provided as required around the periphery of the train of plates 134, such additional wear plates being also bolted to the plate 137.

Means are provided for transmitting and advancing the slideplate segments described immediately above, successively past a loading station, the tapping station and an unloading station. To this end the plates 134 and 135 are provided with sockets 148 (10, 11), the sockets 148 being also useful in accurate positioning of the plates 134 and 135 at the tapping station as by reception of a guide post 149 as seen most clearly in FIGURE 11. The indexing function is accomplished by a linkage including the swinging arm 150 (11, 17, 18) which is mounted for swinging movement around a central guide post 151 fixed to the stationary pad 13. The central guide post 151 also functions as a guide for the base plate 131 of the platform means 120 with a suitable bushing being provided as at 152 to establish the sliding guiding relationship. When the platform means 120 is raised and lowered in the withdrawal phase of the apparatus by the feed means to be described below, an upright pin 155 rigidly fixed to the swinging arm 150 engages one of the sockets 148. The swinging arm 150 is powered in its swinging movement by a hydraulic cylinder 156 which is pivotally mounted to the base plate as seen most clearly in FIGURE 17 and which also pivotally engages the swinging arm 150. The end stop positions of the pivoting arm 150 are accurately determined by set screws 157 and 158 (17). The speed of the swinging movement may be controlled by a hydraulic check 154 which in a well-known manner imposes any desired degree of resistance to movement of the swinging arm 150.

Hold-down means are positioned at the tapping station between the platform 120 and the tapping head 38. This hold-down means comprises a hold-down plate 160 (10, 11, 13, 14) defining openings in register with the array of taps supported by the tap head 38. Means are provided for urging the plate 160 into engagement with nut blanks supported by the platform means 140 during the withdrawal phase in the operation of the apparatus, such means also being adapted to lift the hold-down plate 160 out of such engagement between the conclusion of each withdrawal phase and the initiation of the succeeding feed phase.

In the particular apparatus illustrated, a cover disc 162 (10, 11, 14) is positioned above the center plate 140. The plate 160 is urged upwardly from the cover disc 162 by a small spring-loaded plunger 163 (14).

Identical plungers 163 (not shown) urge the outboard portions of the plate 160 upwardly from structure associated with the non-rotating base plate 131.

Carried bodily on the platform 120 and extending from the top of the hold-down plate 160 to an upwardly extending socket member 165 (14) fixed in the stationary pad member 13 is an adjustable length link 166 which is resiliently urged downwardly by spring washers or elastomeric spring members 167 which are confined between the bottom of the base plate 131 and a shoulder or boss 168 formed on the adjustable length link 166. The relationship is such that the hold-down plate 160 is urged downwardly under the tension of the spring members 167 while the platform 120 is in raised position (as during work-engaging portions of the feed and withdrawal phases of the apparatus) but is allowed to move upwardly out of contact with the workpieces when the adjustable length link 166 bottoms against the inner end wall of the socket member 165 (as when the platform 120 reaches its fully lowered position at the completion of a withdrawal phase). When the hold-down means is relieved from the downward pressure exerted by the spring members 167 it is urged by the relatively light spring pressure of the plungers 163 to raise itself to clear the workpieces 125 and allow the slideplate assembly 134, 135 which is positioned at the tapping station to be translated therefrom to be replaced by a succeeding slideplate assembly 134, 135.

The linkage of which the adjustable length link 166 forms a part is duplicated by similar linkages including adjustable links 170–172 (13).

Ready removal of the hold-down plate 160 may be provided for by the provision of pivoted slotted ears 174 adapted to be pivotally removed from under the nuts 173 (14) associated with each of the links 166 and 170–172. Thus, when the platform 120 is in its lowermost position, the hold-down plate 160 may be urged downwardly against the relatively light pressure of the plungers 163, and the members 174 may then be pivoted out of engagement with the nuts 173 allowing the hold-down plate to be lifted upwardly so that openings 169 (14) formed therein clear the nuts 173 to allow the hold-down plate 160 to be completely removed from the remainder of the apparatus, as for cleaning or repair or for exchange with other hold-down plates adapted to other arrays and sizes of nut blanks to be tapped.

To improve the smoothness and effectiveness of the action of the hold-down plate 160, there may be provided hollow buttons 175 (14a) received in the openings in the perforations in the plate 160 in alignment with the multiple taps. Each hold-down button 175 may be retained by a removable split washer 176 and may have a lower flange 178 extending radially outwardly a slight distance beyond the opening in which the hold-down button 175 is received. The hold-down button may be urged resiliently downwardly for the limit of its travel, which may be in the order of $\frac{1}{32}''$ or some comparable small distance, by a spring washer 179 positioned between the flange 178 and the underside of the hold-down plate 160 as illustrated in FIGURE 14.

*Feed means for tapping operation*

The feed motion of the taps is accomplished in the illustrated apparatus by lead screw means which urges the tap head 38 and the platform 120 relatively together during the feed phase of the operation of the apparatus. In a preferred aspect of the invention, the lead screw means may also urge the platform 120 toward the tap head in a feed phase and away from the tap head in a withdrawal phase at a rate proportional to the rate of rotation of the taps. The directions of feed or withdrawal are determined by the direction of rotation of the taps.

Figure 3:
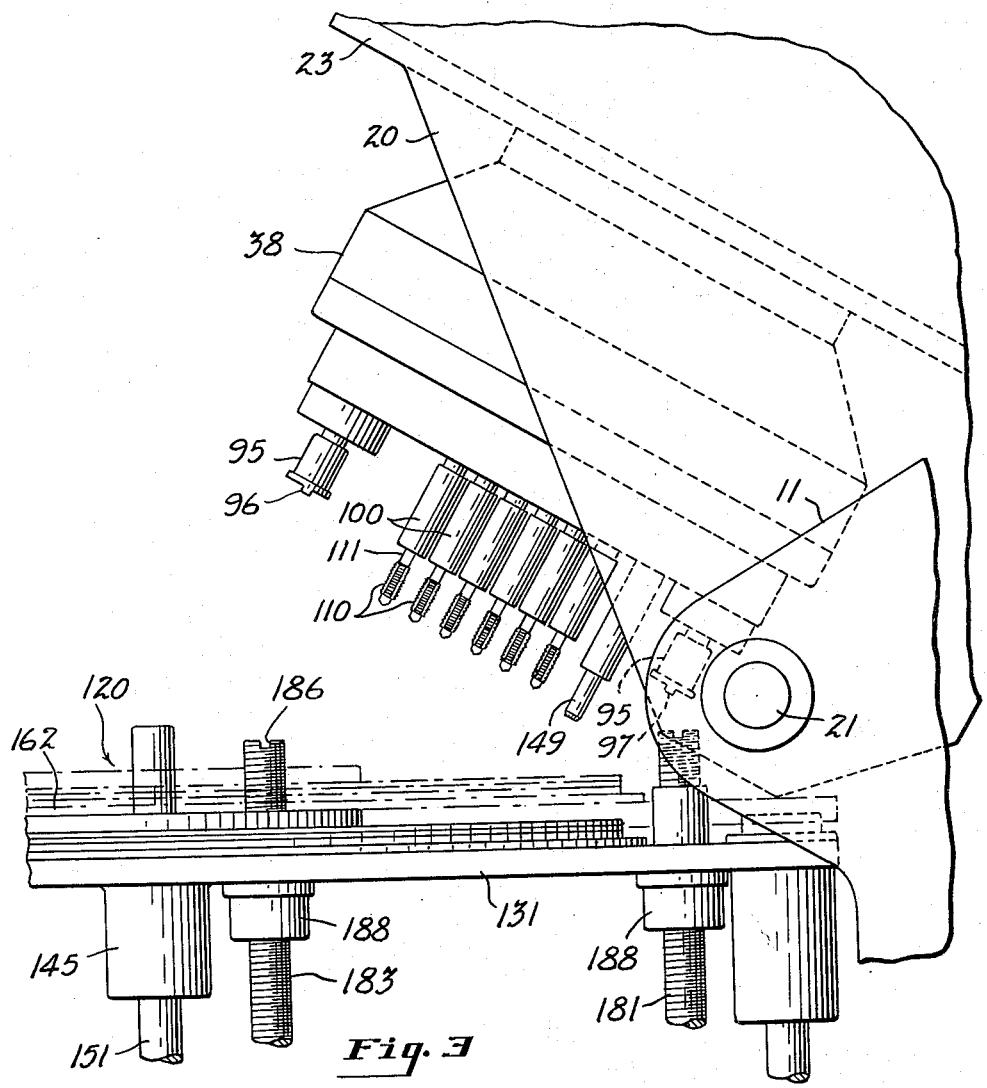
FIGURE 3 is an enlarged fragmentary view of a portion of the apparatus as seen in FIGURE 1 in phantom view.
Figure 3A:
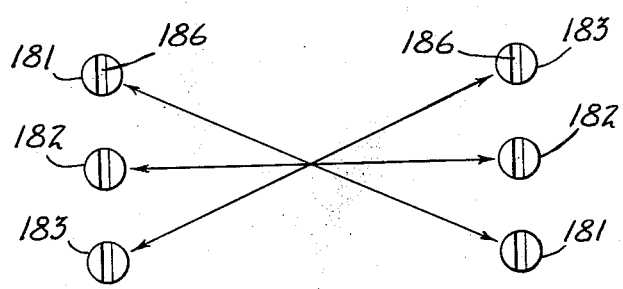
FIGURE 3a is a diagrammatic illustration of the positioning of the members of each pair of lead screws with respect to each other.

The illustrated apparatus includes lead screw means in screw-jacking association between the platform 120 and the stationary support means including the stationary pad 13. Thus there are provided pairs of lead screws 181, 182 and 183 (1, 2, 8, 10, 11, 17) in the particular apparatus illustrated. Each of the pairs of lead screws 181 are associated with each other and are of the same pitch. This is also true of the pairs of lead screws 182 and 183. With reference to the center of the tapping station, the respective members of each pair of lead screws are preferably positioned diametrically opposite to each other, as indicated diagrammatically in FIGURE 3a and as may also be seen in FIGURE 10. Each of the lead screws is rotatably mounted on the pad 13 or other stationary portion of the structure by suitable bearing means 185 (11) and extends through the platform 120 terminating in a free end above the platform. Clutching elements are provided at such free end of each lead screw. In the illustrated apparatus these clutching elements take the form of slots 186 (10, 11, 13).

Second clutching elements are carried by the multiple tap head 38 and are driven by the power means previously described, such second clutching elements being constituted by the clutch elements 95 previously described, the driving ribs 97 of which are adapted to engage in the slots 186. It will be apparent that the clutching elements 95 are respectively disengaged from and engaged in the slots 186 upon shifting of the multiple tap head respectively from and to the operative position illustrated in solid lines in FIGURE 1.

Threaded engagement of each of the lead screws 181–183 with the platform means 120 is accomplished by an associated nut 188 (11) which is removably attached to the platform means as by bolts 189. When the bolts 189 are unfastened, the associated nut 188 may be turned downwardly in surrounding relationship with its lead screw 183, say to an intermediate portion or to a smooth shank portion 190 (11). Accordingly, any one pitch of the plurality of screw shafts 181–183 may be selected by uncoupling from the platform 120 the nuts associated with the other two pairs of screw shafts.

It is also to be noted that the clutch elements 95 are releasably associated with the multiple tap head 38 for uncoupling therefrom as by removal of the keying means or set screws 96 whereby any one pitch of the plurality of screw shafts may be selected by uncoupling from the multiple tap head the clutch component 95 associated with screw shafts having other than the selected pitch.

*Loading and unloading stations*

Figure 1:
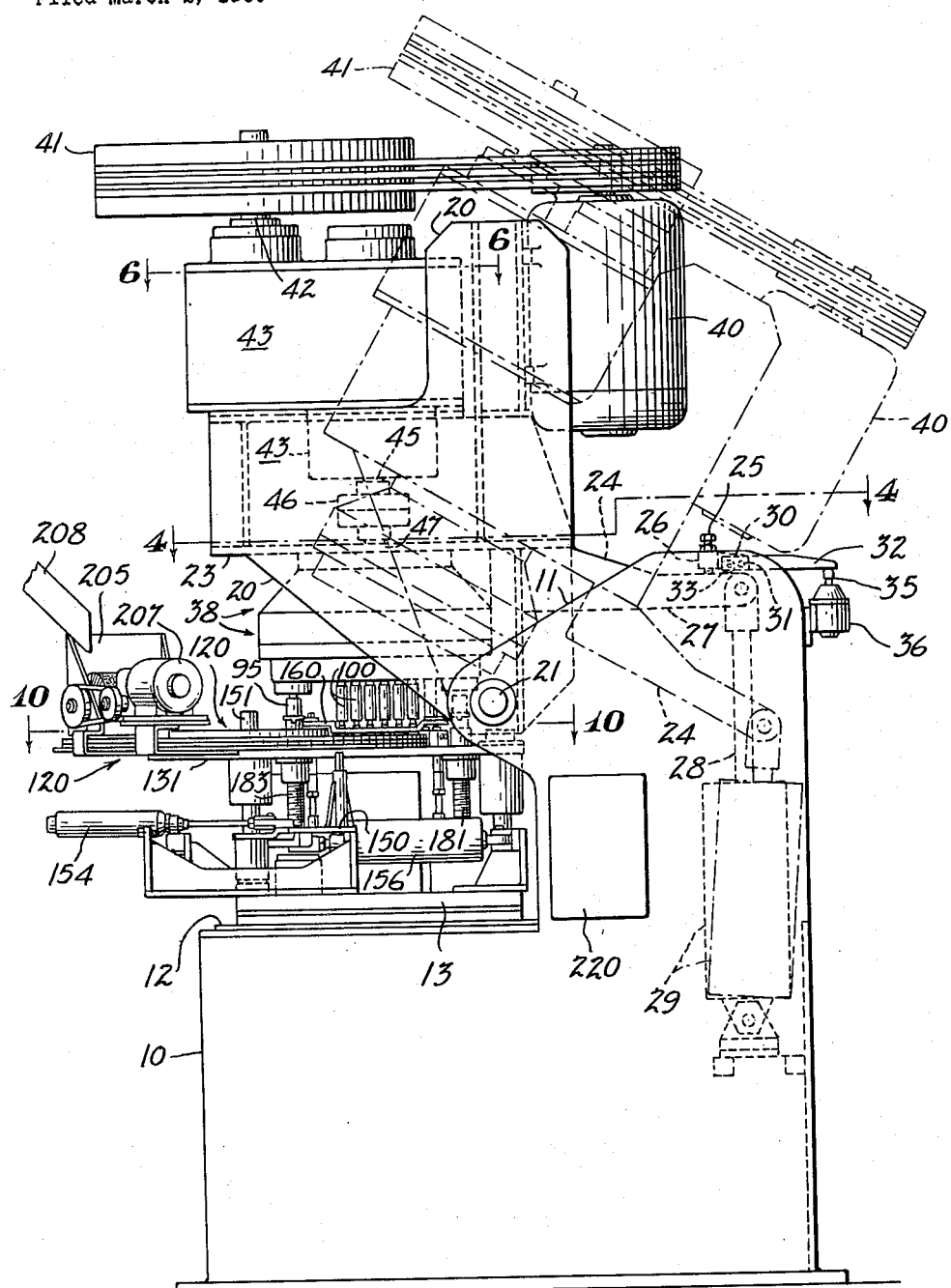
FIGURE 1 is a side elevation of apparatus embodying the invention.
Figure 2:
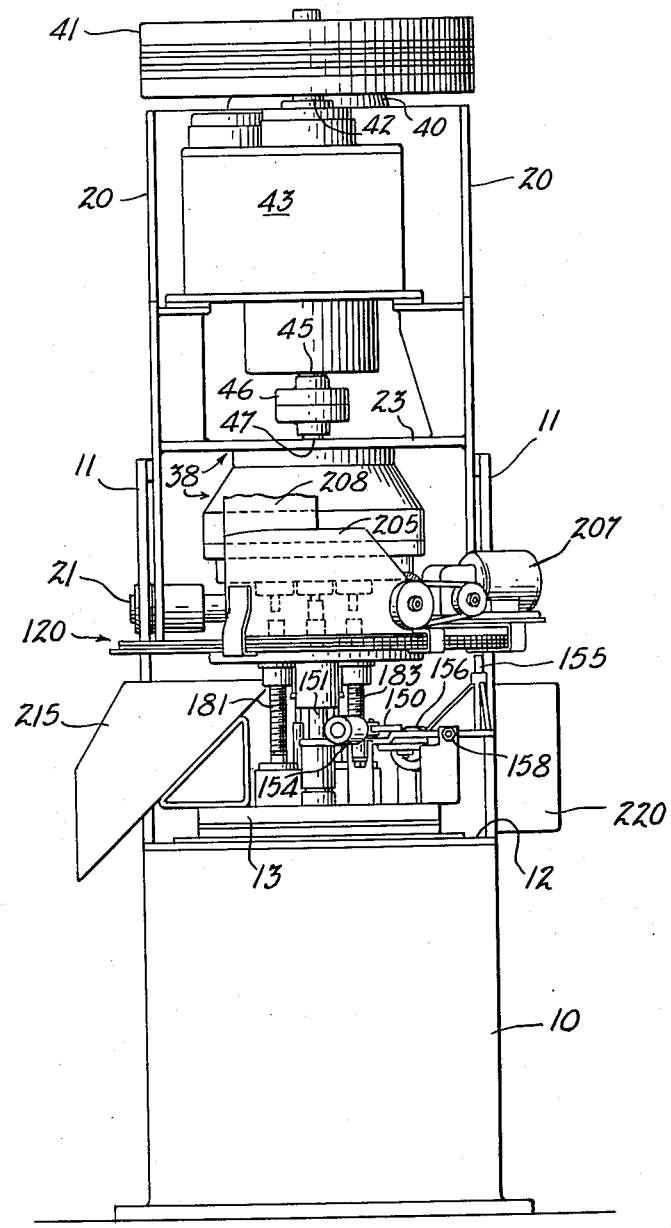
FIGURE 2 is a front elevation of the apparatus seen in FIGURE 1.

A loading station, the angular location of which is generally indicated by the reference numeral 200 in FIGURE 10, is located in the particular apparatus described at the front end of the platform 120. The slideplates associated with the platform 120 rotate in such a direction that they move toward the viewer at the left side of the platform 120, as such platform is viewed in FIGURE 1, and away from the viewer at the right side of the platform 120, as such platform is viewed in FIGURE 1. In other words, the platform moves in the counterclockwise direction as it is seen in FIGURE 10. The angular location of the previously-mentioned tapping station is generally indicated in FIGURE 10 by the reference numeral 201. The angular location of an unloading station is generally indicated in FIGURE 1 by the reference numeral 202.

Figure 15:
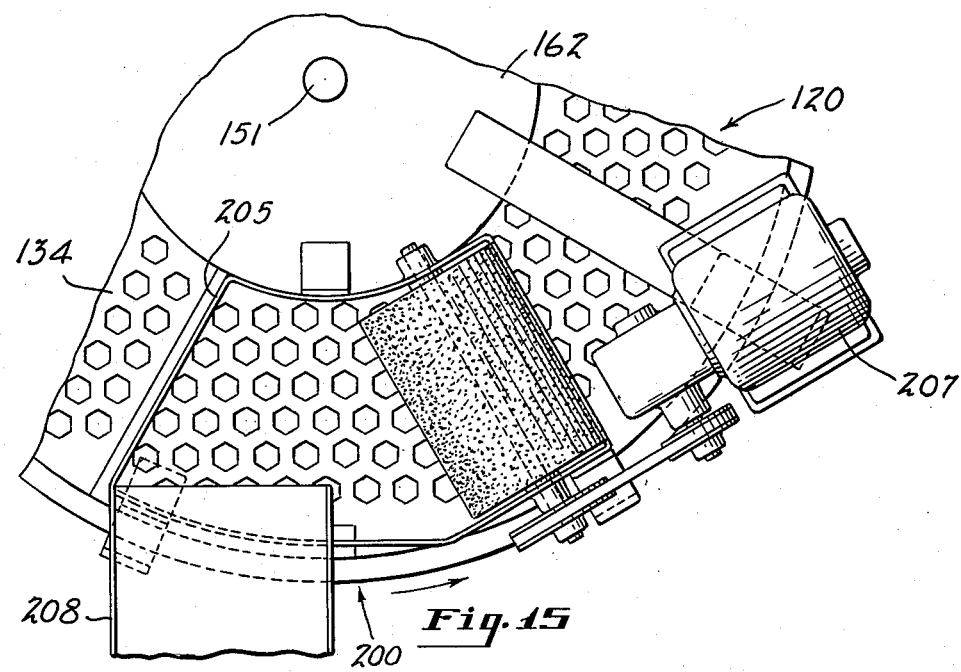
FIGURE 15 is a view of the portion of the apparatus seen in the lower central portion of FIGURE 10 with certain feeding apparatus added.
Figure 16:
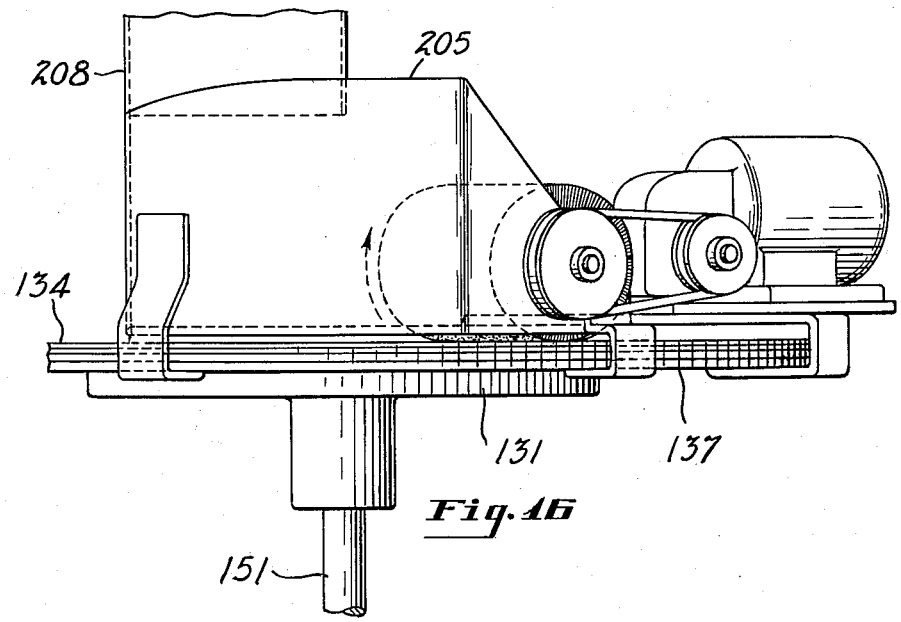
FIGURE 16 is a side elevation of the portion of the apparatus seen in FIGURE 15.

At the loading station 200 is provided a bin 205 (1, 15, 16) which is supported from the underside of the plate 137 by suitable straps as seen in FIGURE 16 and which moves bodily with the platform 120. A rotating brush is rotatably mounted at the trailing end of the bin 205 as indicated most clearly in FIGURES 15 and 16, such brush being powered by a motor 207. The bottom of the bin 205 is open to the nut-receiving sockets formed in the plate 134. The bin 205 is supplied with nut blanks from a chute 208 (1, 16, 17) which loads from stationary supply means (not shown) and the inboard end of which may be adapted to pivot so that the outboard end, seen in FIGURE 1, may move up and down a slight distance to accept upward and downward movement of the platform means 120. The brush may slightly clear or preferably lightly engage the top of the passing slideplates 134.

At the unloading station 202, the base plate 131 is cut away or relieved, as at 210 (10, 17), and underneath such cutout is positioned a bin 215 (10) into which tapped nuts drop as their slideplate segments 134 and 135 advance from the tapping station 201 to the unloading station 202. The non-rotating plates 136 and 137 are suitably relieved at such unloading station in register with the cutout 210 of the base plate 131 to accommodate such dropping-out of the tapped nuts.

The actuation of the various elements may be synchronized by appropriate control means within the control housing 220 (1, 2), such as timing cams and electric switches governed thereby, such switches, either directly or through relays, each serving to reverse solenoid controlled hydraulic valves associated with one of the various hydraulic cylinders previously described, or serving to energize and de-energize the other electrically controllable components such as the windings 63, 66 and the winding associated with the brake element 69, all as is well known to those familiar with machine controls.

The hydraulic cylinder 29 is only relatively infrequently operated, as is the on-off switch for the motor 40, and therefore these members are not controlled from the timer 220 but are controlled by manually operated switches, not shown.

Operation

When the apparatus is in operation, nut blanks are supplied through the chute 108 to the bin 205 and accumulate to a shallow depth within the bin 205 immediately over the surface of passing plates 134 and 135 and thereby are received in the nut-blank-receiving sockets defined in the plate. Some of the nut blanks are not seated entirely within the sockets, but as the plates 134 and 135 advance over the continually rotating brush at the output end of the bin 205, the nut blanks which are partly protruding from the nut-blank-receiving sockets are caused to be seated therein. Those of the nut blanks which protrude to a relatively great degree may be swept back by the rotating brush causing their associated nut-blank-receiving sockets to remain empty, but this has no effect on later operations of the apparatus and merely reduces by an insignificant percentage the total production of the apparatus.

The platform means 120 rises in a feed phase and lowers in a withdrawal phase according to the governing action of whichever pair of lead screws 181–183 is then in feed-governing association with the remainder of the apparatus. As the platform means 120 lowers at the end of a particular tapping operation, the finger associated with the swinging arm 150 (17, 18) is received in one of the sockets 148 (10, 11). Immediately thereafter the timing switch 220 causes the hydraulic cylinder 156 to be actuated to advance the slideplates 134, 135 through one full increment of their intermediate movement around the platform means 120. It is during such movement that the nut blanks received within the nut-blank-receiving sockets of such slideplates are drawn under the rotating brush at the downstream end of the loading station 200.

Figure 17:
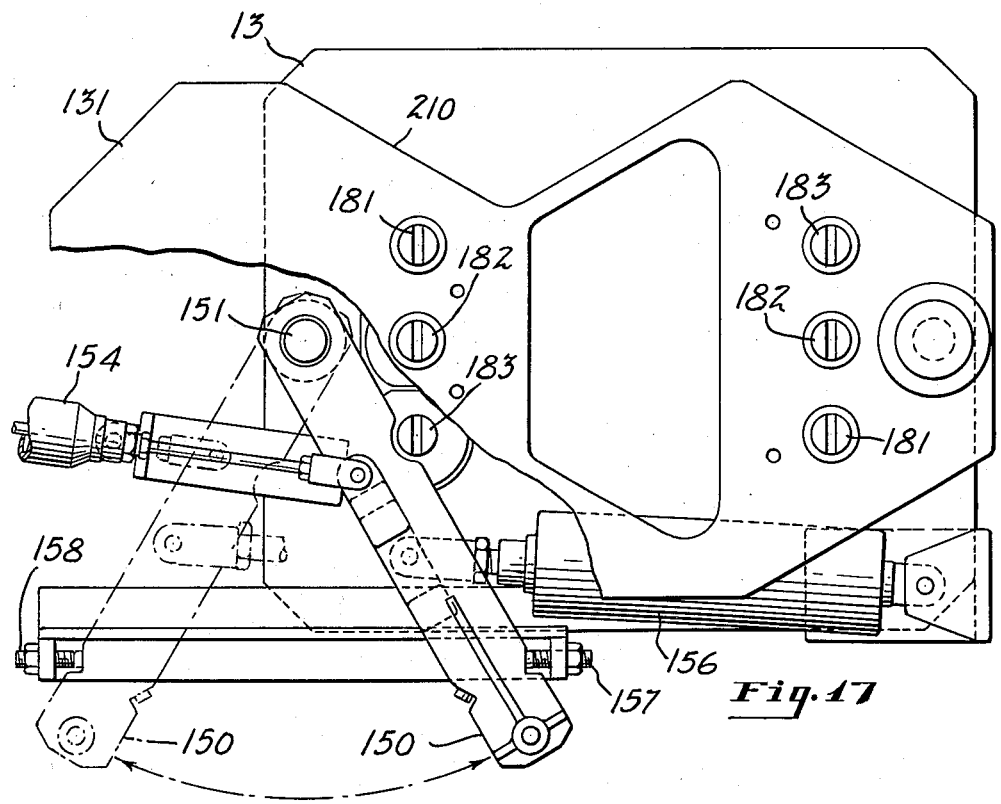
FIGURE 17 is a partly broken away view taken from the plane of line 17—17 in FIGURE 11.
Figure 18:
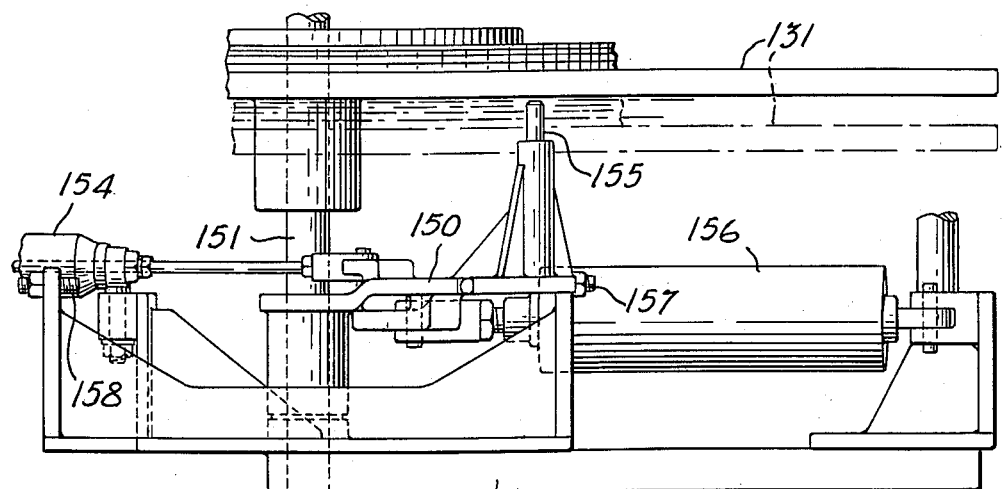
FIGURE 18 is a side elevation of the portion of the apparatus seen in FIGURE 17.

Upon a subsequent raising of the platform means 120, the socket 148 which has just been engaged with the finger of the arm 150 clears such finger and at an appropriate time thereafter the timer 220 causes the cylinder 156 to return the arm 150 to the dotted line position shown in FIGURE 17 preparatory to a succeeding advancement of the slideplates.

In the particular apparatus shown, the load slideplates 134 and 135 which have just advanced from the loading station as above described will idle at two idling stations intermediate the loading station 200 and the tapping station 201 while two cycles of feed-and-withdrawal of the platform means 120 occurs incident to two tapping operations. At the conclusion of each such tapping operation, the particular slideplates being considered will advance to the next station and will thereby be received in their turn at the tapping station 201.

As the particular slideplates 134 and 135 which are being considered are received at the tapping station 201, they pass under the hold-down plate 160 whereby each of the nut blanks held by the slideplates is positioned under one of the hollow buttons 175. At this time the hold-down plate 160 is relieved from the force of the spring members 167 by engagement of the links 166 with the bottoms of the sockets in the socket members 165, so that the hold-down plate 160 is urged slightly upwardly by the relatively light force of the spring-loaded plungers 163 (14) to allow the incoming workpieces to clear the undersides of the buttons 175.

At this moment a tapping cycle is about to begin, and the timer 220 energizes the floating winding 67 causing the brake 69 to release and causing the shaft 45 to be driven in the forward direction from the shaft 42 through the spur gears 51 and 52 and the clutch elements 65 and 66. Through the crank pins 70 and the driving plates 77, the spindles 83 and 84 are powered. Two of the six spindles 84 drive the lead screws 181 which may be the governing lead screws under the particular conditions described. The remaining of the spindles 84 also drive the pairs of lead screws 182 and 183, but the nuts associated with each member of these pairs of lead screws 182 and 183 is dropped out of association with the platform means 120 as by removal of the bolts 189 (11) so that these latter lead screws and the spindles 84 driving them are all merely idlers under the particular conditions described.

As the lead screws 181 turn, the platform means 120 starts to rise bringing the links or posts 166 (14) out of contact with the bottom of the sockets in the members 165 and therefore allowing the spring members 167 to overbear the spring-loaded plungers 163 and bring the buttons 175 on the backing plate 160 into clamping engagement with the tops of the workpieces.

As the platform means 120 starts to rise, the work is brought into engagement with the taps 110. At a moment which may be later than the time the taps initially touch the workpieces but which is not later than the time the taps begin to cut the workpieces, the taps are axially restrained against upward movement by the faces 94 (8) whereby tapping thrust is imposed through the bearing 88 (8) associated with the drive plate 77 and thence through the outer ends 94 of the spindles 83 and the associated inner ends 112 of the taps 110. The position of the taps when the upper ends 112 are in engagement with the faces 94 may be referred to as the "thrust-transmitting" position of the taps. The lowered position of the taps at which the faces 112 and 94 are out of contact may be referred to as the "no-thrust" position of the taps since in such position the taps are incapable of transmitting to the work the thrust forces necessary to the cutting action of the taps.

Thus, when the work-cutting portion of the feed phase gets under way, the taps are in their thrust-transmitting position. The first small interval of time following the imposition of tapping thrust on the workpieces will involve a certain deflection of the platform means and other working parts of the apparatus incident to the strains imposed upon them under the imposition of full tapping thrust. This deflection obtains throughout the remainder of the feed phase in the operation of the apparatus.

The platform 120 continues to rise in the feed phase and the tapping operation is carried out, a significant portion of the work performed during such operation utilizing kinetic energy stored in the flywheel 41.

As the platform means 120 reaches the desired upper limit and the tapping operation is complete, the winding 67 is deenergized causing the brake 69 to engage and the spindles 83 and 84 to stop and causing the platform means to instantaneously halt in its upward movement. Shortly thereafter, the floating winding 63 is energized causing the brake to disengage and the shaft 42 to drive the shaft 45 in the reverse or withdrawal direction through the clutch elements 62 and 61, the spur gear 53, the idler gear 54 and the spur gear 56. The lead screws 181 are thereby reversed causing the platform means to start in the downward direction in the withdrawal phase of the operation of the apparatus.

It will be understood that throughout the work cutting portion of the feed phase in the operation of the apparatus, means associated with the tapping head restrain the taps for imposition of tapping thrust against the workpieces. In the particular apparatus described, such means include the cooperating faces 94 and 112 of the lower ends of the spindles 83 and the upper ends of the taps 110, respectively. An important aspect of the present invention includes the provision of means which not only axially restrains the tap for imposition of tapping thrust as just described but which also removes such axial restraint not later than the terminal part of the work-engaging portion of the withdrawal phase of the operation of the apparatus.

In the particular apparatus disclosed, the axial restraint is removed by actuation of the hydraulic cylinder 36 (4, 5) by the timer 220 at any time after the feed phase has been completed but not later than the terminal part of the work-engaging portion of the withdrawal phase. Present practice is to actuate the hydraulic cylinder 36 immediately after the conclusion of the feed phase and immediately before initiation of the withdrawal phase.

Actuation of the hydraulic cylinder 36 raises the lever 32 (4, 5). Through the great mechanical advantage of this lever, the lever 27 and frame plate 23 are caused to pivot through a small amount of angular movement about the pivot shaft 21 (4, 5) resulting in a slightly upward movement of the tap head 38 in relation to the platform means 120. It will be observed that such slight degree of upward movement results in a relative moving-apart of the tap head 38 and the platform means 120 which is additional to the relative movement between these members incident to the feed and withdrawal motions positively governed by the lead screws 181.

This slight raising of the tap head 38 relieves thrusting forces and the deflections caused thereby. The upper ends or faces 112 of the taps 110 tend to follow the faces 94 which are being removed upwardly therefrom, but only for a very small distance sufficient to fully relieve all such deflections. Thereafter the faces 112 tend to lag to a position slightly below the outer ends or faces 94 of the spindles 83. At this point the apparatus is entirely relieved from the tapping thrust and from the strains and deflections caused thereby.

In the withdrawal phase, the rotation of the taps is synchronized with the moving-apart of the tap head 38 and the platform means 120 according to the pitch of the lead screws 181, just as these motions are similarly synchronized in the feed direction. However, relief of the imposition of tapping thrust as above described allows at least the terminal part of the work-engaging portion of the withdrawal phase to occur in the absence of any tendency for deflected parts to relieve themselves of their deflection as the taps pass out of engagement with the last portions of the formed thread and finally completely out of engagement with the workpieces. Accordingly, there is no tendency for any portions of any of the threads on any of the now-tapped nuts to deform due to imposition of thrust loads on them just prior to relief of the tapping thrust.

As the withdrawal phase is completed, after the taps pass out of engagement with the workpieces, the winding 63 is deenergized and the brake 69 engages causing the spindles 83 and 84 to cease rotating. In the last small portion of this withdrawal motion, the links 166 abut against the bottoms of the sockets 165 allowing the hold-down plate 160 to be lifted slightly by the plungers 163.

At this time the finger on the swinging arm 150 will be received in one of the sockets 148 and the hydraulic cylinder 156 is actuated to advance the particular slideplates to the unloading station 202 to which the now-tapped workpieces or nuts drop through their sockets into the bin or chute 215 (10) where they are collected.

The slideplates 134 and 135, now under discussion, advance to an idler station between the unloading station 202 and the loading station 200 and finally return to the loading station 200. As they slide under the bin 205, their nut-receiving sockets will receive the lowermost of the shallow layer of nuts supported within the bin 205 whereupon the cycle of operations as described above will repeat itself.

If it is desired to replace one of the many taps during production, as upon breaking of one of the many taps, or if it is desired to replace one or all of the taps because of wear, or for other reasons, the motor 40 is turned off and simultaneously the cam drive of the timing switch is stopped and the lines supplying the clutch windings 63 and 67 are opened to assure disengagement of both clutches, and the line supplying the brake winding 64 is closed, whereupon the brake 69 engages. Thereupon a separate manually actuated switch (not shown) is employed to actuate the hydraulic cylinder 29 to raise the head to the dotted line position shown in FIGURE 1. The particular tap or taps in question which are to be removed are then pulled out of their releasable engagement with their associated retaining springs 108 and may, if desired, be immediately replaced by another tap or taps. The hydraulic cylinder 29 is thereupon allowed to again extend to lower the tapping head 38 to the solid line position shown in FIGURE 1 whereupon operation of the apparatus, as above described, may be recommenced with a very minimum loss of production time.

If desired, removal of a tap or taps may be effected by removing its associated tap holder 100 and replacing this sub-assembly by a substitute tap and tap holder sub-assembly 100, such removal is accomplished by merely pulling the tap holder 100 free of its releasably gripped engagement with the rings 91 toward the lower ends of the associated spindle or spindles 83.

It will be apparent that many variations in the many details of the illustrated apparatus will be possible without departing from the essential teachings of this disclosure, including the detailed description of one example of the invention set forth above. Accordingly, the invention is not to be limited to these details, but its scope is to be determined by the following claims.

What is claimed is:

1. A nut tapping machine comprising a plurality of taps extending parallel to each other in spread array at a tapping station, a multiple tap head for supporting said taps in said array at an operative position of said multiple tap head, platform means defining a corresponding array of sockets for supporting nut blank workpieces in apposed relation to said taps, powered feed means for urging said platform means and said tap head relatively together in a feed phase at a rate proportional to the rate of rotation of said taps to engage and tap said workpieces and for then urging said platform means and said tap head relatively apart in a withdrawal phase, power means for powering said array of taps and said powered feed means, means associated with said tap head for axially restraining said taps for imposition of tapping thrust against said workpieces throughout the work-cutting portion of said feed phase and for then removing said axial restraints upon the completion of said feed phase, said multiple tap head being mounted for temporary shifting from its said operative position to access position at which said array of taps is removed from said platform means a sufficient distance to provide for ready removal and replacement of said taps.

2. A nut-tapping machine tool for manufacturing tapped nuts in quantity, said machine tool having a plurality of taps extending parallel to each other in spread array at a tapping station, a multiple tap head for supporting said taps in said array at an operative position of said multiple tap head, platform means defining a corresponding array of sockets for supporting nut blank workpieces in apposed relation to said taps, powered feed means for urging said platform means and said tap head relatively together in a feed phase at a rate proportional to the rate of rotation of said taps to engage and tap said workpieces and for then urging said platform means and said tap head relatively apart in a withdrawal phase, power means for powering said array of taps and said powered feed means, means associated with said tap head for axially restraining said taps for imposition of tapping thrust against said workpieces throughout the work-cutting portion of said feed phase and for then removing said axial restraints not later than the terminal part of the work-engaging portion of said withdrawal phase, the portion of said platform means which defines said workpiece-supporting sockets being translatable transversely with respect to the direction of tapping feed and withdrawal motions of said apparatus between tapping operations, hold-down means positioned at said tapping station between said platform means and said multiple tap head and defining openings in registration with said array of taps supported by said multiple tap head, means for urging said hold-down means into engagement with workpieces supported by said platform means at least during transition from said feed phase to said withdrawal phase and for lifting said hold-down means out of said engagement between the conclusion of each withdrawal phase and the initiation of the succeeding feed phase, said platform means including structure defining slideplate guide means, said socket-defining portion of said platform means comprising perforate slideplates received in said guide means, said perforate slideplates comprising a circular train of slideplate segments translatable along said slideplate guide means in an endless path and successively past a loading station, said tapping station and an unloading station and means for intermittently advancing said segments to said stations between the conclusion of each withdrawal phase and the initiation of the succeeding feed phase.

3. A machine for simultaneously tapping a plurality of nuts comprising a plurality of taps extending parallel to each other in spread array at a tapping station, a multiple tap head for supporting said taps in said array at an operative position of said multiple tap head, platform means defining a corresponding array of sockets for supporting nut blank workpieces in apposed relation to said taps, powered feed means for urging said platform means and said tap head relatively together in a feed phase at a rate proportional to the rate of rotation of said taps to engage and tap said workpieces and for then urging said platform means and said tap head relatively apart in a withdrawal phase, power means for powering said array of taps and said powered feed means, means associated with said tap head for axially restraining said taps for imposition of tapping thrust against said workpieces throughout the work-cutting portion of said feed phase and for then removing said axial restraints not later than the terminal part of the work-engaging portion of said withdrawal phase, the portion of said platform means which defines said workpiece-supporting sockets being translatable transversely with respect to the direction of tapping feed and withdrawal motions of said apparatus between tapping operations, hold-down means positioned at said tapping station between said platform means and said multiple tap head and defining openings in registration with said array of taps supported by said multiple tap head, means for urging said hold-down means into engagement with workpieces supported by said platform means at least during transition from said feed phase to said withdrawal phase and for lifting said hold-down means out of said engagement between the conclusion of each withdrawal phase and the initiation of the succeeding feed phase.

4. Apparatus for tapping a number of nuts at the same time and including stationary support means, a plurality of taps extending parallel to each other in spread array, a multiple tap head for supporting said taps in said array, platform means defining a corresponding array of sockets for supporting nut blank workpieces in apposed relation to said taps, lead screw means in screw-jacking association between said stationary support means and said platform means for relatively urging said platform means toward said tap head in a feed phase and away from said tap head in a withdrawal phase at a rate proportional to the rate of rotation of said taps and in a direction determined by the direction of rotation of said taps, power means for powering said array of taps and said lead screw means, said taps being keyed to said tap head for rotational driving thereby and said taps also being received by said tap head for limited sliding motion relative thereto between inward thrust-transmitting positions of said taps and outward no-thrust positions of said taps, thrust faces associaed with said tap head and against which said taps abut only in their said inward thrust-transmitting positions, means for moving said tap head through an increment of movement relative to said stationary support means and away from said platform means with said increment of movement occurring upon the completion of said feed phase.

5. A machine for simultaneously tapping a plurality of nuts comprising stationary support means, a plurality of taps extending parallel to each other in spread array, a multiple tap head for supporting said taps in said array, platform means defining a corresponding array of sockets for supporting nut blank workpieces in apposed relation to said taps, lead screw means in screw-jacking association between said stationary support means and one of said platform means and said tap head for relatively urging said platform means and tap head together in a feed phase and apart in a withdrawal phase at a rate proportional to the rate of rotation of said taps and in a direction determined by the direction of rotation of said taps, power means for powering said array of taps and said lead screw means, said taps being keyed to said tap head for rotational driving thereby and taid taps also being received by said tap head for limited sliding motion relative thereto between inward thrust-transmitting positions of said taps and outward no-thrust positions of said taps, thrust faces associated with said tap head and against which said taps abut only in their said inward thrust-transmitting positions, means for moving the one of said platform means and tap head which is not in the aforesaid screw-jacking association with said lead screw means through an increment of movement relative to said stationary support means and away from the one of said platform means and tap head which is in the aforesaid screw-jacking association with said lead screw means with said increment of movement occurring prior to initiation of said withdrawal phase.

6. A nut tapping machine comprising a plurality of taps extending parallel to each other in spread array, a multiple tap head for supporting said taps in said array, platform means defining a corresponding array of sockets for supporting nut blank workpieces in apposed relation to said taps, powered feed means for relatively urging said platform means and tap head together in a feed phase and apart in a withdrawal phase at a rate proportional to the rate of rotation of said taps and in a direction determined by the direction of rotation of said taps, power means for powering said array of taps and said powered feed means, said taps being keyed to said tap head for rotational driving thereby and said taps also being received by said tap head for limited sliding motion relative thereto between inward thrust-transmitting positions of said taps and outward no-thrust positions of said taps, thrust faces associated with said tap head and against which said taps abut only in their said inward thrust-transmitting positions, means for moving said platform and said tap head relatively apart through an increment of movement additional to that of said withdrawal phase after the conclusion of said feed phase and not later than the terminal part of the work-engaging portion of said withdrawal phase to thereby allow said taps to shift toward said outward no-thrust positions during withdrawal of said taps from said workpieces.

7. Apparatus for tapping a number of nuts at the same time and including stationary support means, a plurality of taps extending parallel to each other in spread array at a tapping station, a multiple tap head for supporting said taps in said array at an operative position of said multiple tap head, platform means defining a corresponding array of sockets for supporting nut blank workpieces in apposed relation to said taps, lead screw means in screw-jacking association between said stationary support means and said platform means for relatively urging said platform means toward said tap head in a feed phase and away from said tap head in a withdrawal phase at a rate proportional to the rate of rotation of said taps and in a direction determined by the direction of rotation of said taps, power means for powering said array of taps and said lead screw means and comprising a motor in driving association with a flywheel, flywheel output shaft means, a main shaft means for driving said taps, a plurality of tap spindles coupled in driven association with said main shaft means, and torque-reversing linkage means between said flywheel output shaft means and said main shaft means, said taps being keyed to said tap head for rotational driving thereby and said taps also being received by said tap head for limited sliding motion relative thereto between inward thrust-transmitting positions of said taps and outward no-thrust positions of said taps, thrust faces associated with said tap head and against which said taps abut only in their said inward thrust-transmitting positions, means for moving said tap head through an increment of movement relative to said stationary support means and away from said platform means with said increment of movement occurring after the conclusion of said feed phase and not later than the terminal part of the work-engaging portion of said withdrawal phase to thereby allow said taps to shift toward said outward no-thrust positions during withdrawal of said taps from said workpieces, said multiple tap head being mounted for temporary shifting from its said operative position to access position at which said array of taps is removed from said platform means a sufficient distance to provide for ready removal and replacement of said taps, quick-release means for selectively disassociating from said tap head each of the taps in said array of taps, said tap head comprising a plurality of tap spindles terminating at their outer ends at said thrust faces, said quick-release means comprising tap holders keyed to and releasably mounted on said tap spindles, said taps being received in mating and keying relationship within said tap holders, said tap holders being open at both ends, the inner ends of said taps being engageable against said outer ends of said tap spindles to establish said inward thrust-transmitting position of said taps and said taps being slidable within said tap holders from said inward thrust-transmitting position to said outward no-thrust position, gripping means releasably restraining said taps from removal from said tap holders whereby said taps are prevented from dropping from said tap holders when said taps are not in engagement with the workpieces, said gripping means comprising a helical spring positioned within each said tap holder in surrounding and gripping relationship with the shank of each said tap, the inside of said tap holder being threaded at the portion thereof corresponding to the location of said helical spring and said spring being interengaged with said inside threaded portion of said tap holder, the portion of said platform means which defines said workpiece-supporting sockets being translatable transversely with respect to the direction of tapping feed and withdrawal motions of said apparatus between tapping operations, hold-down means positioned at said tapping station between said platform means and said multiple tap head and defining openings in registration with said array of taps supported by said multiple tap head, means for urging said hold-down means into engagement with workpieces supported by said platform means at least during transition from said feed phase to said withdrawal phase and for lifting said hold-down means out of said engagement between the conclusion of each withdrawal phase and the initiation of the succeeding feed phase, said platform means including structure defining slideplate guide means, said socket-defining portion of said platform means comprising perforate slideplates received in said guide means, said perforate slideplates comprising a circular train of slideplate segments translatable along said slideplate guide means in an endless path and successively past a loading station, said tapping station and an unloading station and means for intermittently advancing said segments to said stations between the conclusion of each withdrawal phase and the initiation of the succeeding feed phase.

8. A nut-tapping machine tool for manufacturing tapped nuts in quantity, said machine tool having stationary support means, a plurality of taps extending parallel to each other in spread array, a multiple tap head for supporting said taps in said array, said multiple tap head being shiftable from and to an operative position, platform means defining a corresponding array of sockets for supporting nut blank workpieces in apposed relation to said taps, lead screw means in screw-jacking association between said stationary support means and said platform means for relatively urging said platform means toward said tap head in a feed phase and away from said tap head in a withdrawal phase at a rate proportional to the rate of rotation of said taps and in a direction determined by the direction of rotation of said taps, power means for powering said array of taps and said lead screw means, said taps being keyed to said tap head for rotational driving thereby and said taps also being received by said tap head for limited sliding motion relative thereto between inward thrust-transmitting positions of said taps and outward no-thrust positions of said taps, thrust faces associated with said tap head and against which said taps abut only in their said inward thrust-transmitting positions, means for moving said tap head through an increment of movement relative to said stationary support means and away from said platform means with said increment of movement occurring after the conclusion of said feed phase and not later than the terminal part of the work-engaging portion of said withdrawal phase to thereby allow said taps to shift toward said outward no-thrust positions during withdrawal of said taps from said workpieces, said lead screw means comprising threaded lead screw shaft means rotatably mounted on said stationary support means and extending through said platform means and terminating in a free end, first clutching elements at said free end, nut means associated with said platform means for threadedly engaging said threaded lead screw shaft means, second clutching elements carried by said multiple tap head and in driven engagement with said power means, said second clutching elements being respectively disengaged from and engaged with said first clutching elements upon shifting of said multiple tap head respectively from and to said operative position.

9. A nut tapping machine comprising a plurality of taps extending parallel to each other in spread array, a multiple tap head for supporting said taps in said array, platform means defining a corresponding array of sockets for supporting nut blank workpieces in apposed relation to said taps, powered feed means for urging said platform means and said tap head relatively together in a feed phase at a rate proportional to the rate of rotation of said taps to engage and tap said workpieces and for then urging said platform means and said tap head relatively apart in a withdrawal phase, power means for powering said array of taps and said powered feed means, means associated with said tap head for axially restraining said taps for imposition of tapping thrust against said workpieces throughout the work-cutting portion of said feed phase and for then removing said axial restraints not later than the terminal part of the work-engaging portion of said withdrawal phase.

10. A machine for simultaneously tapping a plurality of nuts comprising stationary support means, a plurality of taps extending parallel to each other in spread array, a multiple tap head for supporting said taps in said array, platform means defining a corresponding array of sockets for supporting nut blank workpieces in apposed relation to said taps, lead screw means in screw-jacking association between said stationary support means and said platform means for relatively urging said platform means toward said tap head in a feed phase and away from said tap head in a withdrawal phase at a rate proportional to the rate of rotation of said taps and in a direction determined by the direction of rotation of said taps, power means for powering said array of taps and said lead screw means, said taps being keyed to said tap head for rotational driving thereby and said taps also being received by said tap head for limited sliding motion relative thereto between inward thrust-transmitting positions of said taps and outward no-thrust positions of said taps, thrust faces associated with said tap head and against which said taps abut only in their said inward thrust-transmitting positions, means for moving said tap head through an increment of movement relative to said stationary support means and away from said platform means with said increment of movement occurring after the conclusion of said feed phase and not later than the terminal part of the work-engaging portion of said withdrawal phase to thereby allow said taps to shift toward said outward no-thrust positions during withdrawal of said taps from said workpieces, said lead screw means comprising threaded lead screw shaft means rotatably mounted on said stationary support means and extending through said platform means and terminating in a free end, first clutching elements at said free end, nut means associated with said platform means for threadedly engaging said threaded lead screw shaft means, second clutching elements carried by said multiple tap head and in driven engagement with said power means, said second clutching elements being respectively disengaged from and engaged with said first clutching elements upon shifting of said multiple tap head respectively from and to said operative position, said lead screw shaft means comprising a plurality of screw shafts of different pitch, said second clutching elements comprising a plurality of clutch components each engageable with its own screw shaft, said clutch components each being releasably associated with said multiple tap head for uncoupling therefrom whereby any one pitch of said plurality of screw shafts may be selected by uncoupling from said multiple tap head the clutch components associated with screw shafts having other than the selected pitch.

11. A nut-tapping machine tool for manufacturing tapped nuts in quantity, said machine tool having a plurality of taps extending parallel to each other in spaced array, a multiple tap head for supporting said taps in said array, platform means defining a corresponding array of sockets for supporting nut blank workpieces in apposed relation to said taps, lead screw means for relatively urging said platform means and tap head together in a feed phase and apart in a withdrawal phase at a rate proportional to the rate of rotation of said taps and in a direction determined by the direction of rotation of said taps, power means for powering said array of taps and said lead screw means and comprising a motor in driving association with a flywheel, flywheel output shaft means, a main shaft means for driving said taps, a plurality of tap spindles coupled in driven association with said main shaft means, and torque-reversing linkage means between said flywheel output shaft means and said main shaft means, means associated with said tap head for axially restraining said taps for imposition of tapping thrust against said workpieces throughout the work-cutting portion of said feed phase and for then removing said axial restraints upon the completion of said feed phase.

12. Apparatus for tapping a number of nuts at the same time and including a plurality of taps extending parallel to each other in spread array at a tapping station, a multiple tap head for supporting said taps in said array at an operative position of said multiple tap head, platform means defining a corresponding array of sockets for supporting nut blank workpieces in apposed relation to said taps, powered feed means for urging said platform means and said tap head relatively together in a feed phase at a rate proportional to the rate of rotation of said taps to engage and tap said workpieces and for then urging said platform means and said tap head relatively apart in a withdrawal phase, power means for powering said array of taps and said powered feed means, means associated with said tap head for axially restraining said taps for imposition of tapping thrust against said workpieces throughout the work-cutting portion of said feed phase and for then removing said axial restraints upon the completion of said feed phase, said multiple tap head being mounted for temporary shifting from its said operative position to access position at which said array of taps is removed from said platform means a sufficient distance to provide for ready removal and replacement of said taps, quick-release means for selectively disassociating from said tap head each of the taps in said array of taps, said tap head comprising a plurality of tap spindles terminating at their outer ends at said thrust faces, said quick-release means comprising tap holders keyed to and releasably mounted on said tap spindles, said taps being received in mating and keying relationship within said tap holders, said tap holders being open at both ends, the inner ends of said taps being engageable against said outer ends of said tap spindles to establish said inward thrust-transmitting position of said taps and said taps being slidable within said tap holders from said inward thrust-transmitting position to said outward no-thrust position, gripping means releasably restraining said taps from removal from said tap holders whereby said taps are prevented from dropping from said tap holders when said taps are not in engagement with the workpieces.

13. Apparatus for tapping a number of nuts at the same time and including stationary support means, a plurality of taps extending parallel to each other in spread array, a multiple tap head for supporting said taps in said array, platform means defining a corresponding array of sockets for supporting nut blank workpieces in apposed relation to said taps, lead screw means in screw-jacking association between said stationary support means and one of said platform means and said tap head for relatively urging said platform means and tap head together in a feed phase and apart in a withdrawal phase at a rate proportional to the rate of rotation of said taps and in a direction determined by the direction of rotation of said taps, power means for powering said array of taps and said lead screw means, means associated with said tap head for axially restraining said taps for imposition of tapping thrust against said workpieces throughout the work-cutting portion of said feed phase and for then removing said axial restraints prior to initiation of said withdrawal phase.

14. A nut tapping machine comprising stationary support means, a plurality of taps extending parallel to each other in spread array, a multiple tap head for supporting said taps in said array, platform means defining a corresponding array of sockets for supporting nut blank workpieces in apposed relation to said taps, leads screw means in screw-jacking association between said stationary support means and said platform means for relatively urging said platform means toward said tap head in a feed phase and away from said tap head in a withdrawal phase at a rate proportional to the rate of rotation of said taps and in a direction determined by the direction of rotation of said taps, power means for powering said array of taps and said lead screw means, said taps being keyed to said tap head for rotational driving thereby and said taps also being received by said tap head for limited sliding motion relative thereto between inward thrust-transmitting positions of said taps and outward no-thrust positions of said taps, thrust faces associated with said tap head and against which said taps abut only in their said inward thrust-transmitting positions, means for moving said tap head through an increment of movement relative to said stationary support means and away from said platform means with said increment of movement occurring after the conclusion of said feed phase and not later than the terminal part of the work-engaging portion of said withdrawal phase to thereby allow said taps to shift toward said outward no-thrust positions during withdrawal of said taps from said workpieces, said lead screw means comprising threaded lead screw shaft means rotatably mounted on said stationary support means and extending through said platform means and terminating in a free end, first clutching elements at said free end, nut means associated with said platform means for threadedly engaging said threaded lead screw shaft means, second clutching elements carried by said multiple tap head and in driven engagement with said power means, said second clutching elements being respectively disengaged from and engaged with said first clutching elements upon shifting of said multiple tap head respectively from and to said operative position, said lead screw shaft means comprising a plurality of screw shafts of different pitch, said nut means comprising a plurality of nuts each associated with its own one of said screw shafts, said nuts each being releasably associated with said platform means for uncoupling therefrom whereby any one pitch of said plurality of screw shafts may be selected by uncoupling from said platform the nuts associated with screw shafts having other than the selected pitch.

15. A nut tapping machine comprising a plurality of taps extending parallel to each other in spread array, a multiple tap head for supporting said taps in said array, platform means defining a corresponding array of sockets for supporting nut blank workpieces in apposed relation to said taps, powered feed means for urging said platform means and said tap head relatively together in a feed phase at a rate proportional to the rate of rotation of said taps to engage and tap said workpieces and for then urging said platform means and said tap head relatively apart in a withdrawal phase, power means for powering said array of taps and said powered feed means, means associated with said tap head for axially restraining said taps for imposition of tapping thrust against said workpieces throughout the work-cutting portion of said feed phase and for then removing said axial restraints not later than the terminal part of the work-engaging portion of said withdrawal phase, the portion of said platform means which defines said workpiece-supporting sockets being translatable transversely with respect to the direction of tapping feed and withdrawal motions of said apparatus between tapping operations.

16. A machine for simultaneously tapping a plurality of nuts comprising a plurality of taps extending parallel to each other in spread array, a multiple tap head for supporting said taps in said array, platform means defining a corresponding array of sockets for supporting nut blank workpieces in apposed relation to said taps, lead screw means for relatively urging said platform means and tap head together in a feed phase and apart in a withdrawal phase at a rate proportional to the rate of rotation of said taps and in a direction determined by the direction of rotation of said taps, power means for powering said array of taps and said lead screw means, means associated with said tap head for axially restraining said taps for imposition of tapping thrust against said workpieces throughout the work-cutting portion of said feed phase and for then removing said axial restraints not later than the terminal part of the work-engaging portion of said withdrawal phase.

17. A machine for simultaneously tapping a plurality of nuts comprising a plurality of taps extending parallel to each other in spread array at a tapping station, a multiple tap head for supporting said taps in said array at an operative position of said multiple tap head, platform means defining a corresponding array of sockets for supporting nut blank workpieces in apposed relation to said taps, powered feed means for urging said platform means and said tap head relatively together in a feed phase at a rate proportional to the rate of rotation of said taps to engage and tap said workpieces and for then urging said platform means and said tap head relatively apart in a withdrawal phase, power means for powering said array of taps and said powered feed means, means associated with said tap head for axially restraining said taps for imposition of tapping thrust against said workpieces throughout the work-cutting portion of said feed phase and for then removing said axial restraints upon the completion of said feed phase, said multiple tap head being mounted for temporary shifting from its said operative position to access position at which said array of taps is removed from said platform means a sufficient distance to provide for ready removal and replacement of said taps, quick-release means for selectively disassociating from said tap head each of the taps in said array of taps, said tap head comprising a plurality of tap spindles terminating at their outer ends at said thrust faces, said quick-release means comprising tap holders keyed to and releasably mounted on said tap spindles, said taps being received in mating and keying relationship within said tap holders.

18. A nut-tapping machine tool for manufacturing tapped nuts in quantity, said machine tool having a plurality of taps extending parallel to each other in spread array at a tapping station, a multiple tap head for supporting said taps in said array at an operative position of said multiple tap head, platform means defining a corresponding array of sockets for supporting nut blank workpieces in apposed relation to said taps, lead screw means in screw-jacking association between said stationary support means and said platform means for relatively urging said platform means toward said tap head in a feed phase and away from said tap head in a withdrawal phase at a rate proportional to the rate of rotation of said taps and in a direction determined by the direction of rotation of said taps, power means for powering said array of taps and said lead screw means and comprising a motor in driving association with a flywheel, flywheel output shaft means, a main shaft means for driving said taps, a plurality of tap spindles coupled in driven association with said main shaft means, and torque-reversing linkage means between said flywheel output shaft means and said main shaft means, said taps being keyed to said tap head for rotational driving thereby and said taps also being received by said tap head for limited sliding motion relative thereto between inward thrust-transmitting positions of said taps and outward no-thrust positions of said taps, thrust faces associated with said tap head and against which said taps abut only in their said inward thrust-transmitting positions, means for moving said tap head through an increment of movement relative to said stationary support means and away from said platform means with said increment of movement occurring after the conclusion of said feed phase and not later than the terminal part of the work-engaging portion of said withdrawal phase to thereby allow said taps to shift toward said outward no-thrust positions during withdrawal of said taps from said workpieces, said multiple tap head being mounted for temporary shifting from its said operative position to access position at which said array of taps is removed from said platform means a sufficient distance to provide for ready removal and replacement of said taps, quick-release means for selectively disassociating from said tap head each of the taps in said array of taps, said tap head comprising a plurality of tap spindles terminating at their outer ends at said thrust faces, said quick-release means comprising tap holders keyed to and releasably mounted on said tap spindles, said taps being received in mating and keying relationship within said tap holders, said tap holders being open at both ends, the inner ends of said taps being engageable against said outer ends of said tap spindles to establish said inward thrust-transmitting position of said taps and said taps being slidable within said tap holders from said inward thrust-transmitting position to said outward no-thrust position, gripping means releasably restraining said taps from removal from said tap holders whereby said taps are prevented from dropping from said tap holders when said taps are not in engagement with the workpieces, said gripping means comprising a helical spring positioned within each said tap holder in surrounding and gripping relationship with the shank of each said tap, the inside of said tap holder being threaded at the portion thereof corresponding to the location of said helical spring and said spring being interengaged with said inside threaded portion of said tap holder, the portion of said platform means which defines said workpiece-supporting sockets being translatable transversely with respect to the direction of tapping feed and withdrawal motions of said apparatus between tapping operations, hold-down means positioned at said tapping station between said platform means and said multiple tap head and defining openings in registration with said array of taps supported by said multiple tap head, means for urging said hold-down means into engagement with workpieces supported by said platform means at least during transition from said feed phase to said withdrawal phase and for lifting said hold-down means out of engagement between the conclusion of each withdrawal phase and the initiation of the succeeding feed phase, said platform means including structure defining slideplate guide means, said socket-defining portion of said platform means comprising perforate slideplates received in said guide means, said perforate slideplates comprising a circular train of slideplate segments translatable along said slideplate guide means in an endless path and successively past a loading station, said tapping station and an unloading station and means for intermittently advancing said segments to said stations between the conclusion of each withdrawal phase and the initiation of the succeeding feed phase, said lead screw means comprising threaded lead screw shaft means rotatably mounted on said stationary support means and extending through said platform means and terminating in a free end, first clutching elements at said free end, nut means associated with said platform means for threadedly engaging said threaded lead screw shaft means, second clutching elements carried by said multiple tap head and in driven engagement with said power means, said second clutching elements being respectively disengaged from and engaged with said first clutching elements upon shifting of said multiple tap head respectively from and to said operative position.

19. A nut-tapping machine tool for manufacturing tapped nuts in quantity, said machine tool having stationary support means, a plurality of taps extending parallel to each other in spread array, a multiple tap head for supporting said taps in said array, platform means defining a corresponding array of sockets for supporting nut blank workpieces in apposed relation to said taps, lead screw means in screw-jacking association between said stationary support means and said platform means for relatively urging said platform means toward said tap head in a feed phase and away from said tap head in a withdrawal phase at a rate proportional to the rate of rotation of said taps and in a direction determined by the direction of rotation of said taps, power means for powering said array of taps and said lead screw means, means associated with said tap head for axially restraining said taps for imposition of tapping thrust against said workpieces throughout the work-cutting portion of said feed phase and for then removing said axial restraints upon the completion of said feed phase.

20. Apparatus for tapping a number of nuts at the same time and including a plurality of taps extending parallel to each other in spread array at a tapping station, a multiple tap head for supporting said taps in said array at an operative position of said multiple tap head, platform means defining a corresponding array of sockets for supporting nut blank workpieces in apposed relation to said taps, powered feed means for urging said platform means and said tap head relatively together in a feed phase at a rate proportional to the rate of rotation of said taps to engage and tap said workpieces and for then urging said platform means and said tap head relatively apart in a withdrawal phase, power means for powering said array of taps and said powered feed means, means associated with said tap head for axially restraining said taps for imposition of tapping thrust against said workpieces throughout the work-cutting portion of said feed phase and for then removing said axial restraints not later than the terminal part of the work-engaging portion of said withdrawal phase, the portion of said platform means which defines said workpiece-supporting sockets being translatable transversely with respect to the direction of tapping feed and withdrawal motions of said apparatus between tapping operations, hold-down means positioned at said tapping station between said platform means and said multiple tap head and defining openings in registration with said array of taps supported by said multiple tap head, means for urging said hold-down means into engagement with workpieces supported by said platform means at least during transition from said feed phase to said withdrawal phase and for lifting said hold-down means out of said engagement between the conclusion of each withdrawal phase and the initiation of the succeeding feed phase, said platform means including structure defining slideplate guide means, said socket-defining portion of said platform means comprising perforate slideplates received in said guide means.

References Cited in the file of this patent
UNITED STATES PATENTS

| | | |
|---|---|---|
| 974,406 | Lundgren | Nov. 1, 1910 |
| 2,105,330 | Pagenkopf | Jan. 11, 1938 |
| 2,253,153 | Trumble | Aug. 19, 1941 |
| 2,863,160 | Ovshinsky | Dec. 9, 1958 |